United States Patent
Oh

(10) Patent No.: US 12,252,155 B2
(45) Date of Patent: Mar. 18, 2025

(54) VEHICLE AND METHOD OF CONTROLLING CUT-IN RESPONSE

(71) Applicants: Hyundai Motor Company, Seoul (KR); Kia Corporation, Seoul (KR)

(72) Inventor: Tae Dong Oh, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 82 days.

(21) Appl. No.: 17/457,959

(22) Filed: Dec. 7, 2021

(65) Prior Publication Data

US 2022/0204041 A1 Jun. 30, 2022

(30) Foreign Application Priority Data

Dec. 29, 2020 (KR) ........................ 10-2020-0186461

(51) Int. Cl.
*B60W 60/00* (2020.01)
*B60W 40/04* (2006.01)

(52) U.S. Cl.
CPC ........ *B60W 60/0027* (2020.02); *B60W 40/04* (2013.01); *B60W 2554/4045* (2020.02); *B60W 2554/4046* (2020.02); *B60W 2554/80* (2020.02); *B60W 2555/60* (2020.02); *B60W 2720/103* (2013.01)

(58) Field of Classification Search
CPC ............. B60W 60/0027; B60W 40/04; B60W 2555/60; B60W 2554/80; B60W 2554/4045; B60W 2554/4046; B60W 2720/103
See application file for complete search history.

(56) References Cited

U.S. PATENT DOCUMENTS

| | | | | |
|---|---|---|---|---|
| 9,227,632 B1* | 1/2016 | Lee | ................... | B60W 30/0956 |
| 11,468,773 B2* | 10/2022 | Caldwell | .............. | G05D 1/0219 |
| 2018/0082589 A1* | 3/2018 | Park | ................... | B60W 30/0956 |
| 2019/0155290 A1* | 5/2019 | Luo | ....................... | G05D 1/0214 |
| 2021/0181741 A1* | 6/2021 | Yao | ....................... | G05D 1/0214 |
| 2021/0370921 A1* | 12/2021 | Silva | ................. | B60W 60/0027 |
| 2022/0118976 A1* | 4/2022 | Wiesenberg | .......... | B60W 30/16 |
| 2022/0161849 A1* | 5/2022 | Kubota | ................ | B62D 15/025 |

* cited by examiner

*Primary Examiner* — Dale W Hilgendorf
*Assistant Examiner* — Hana Lee
(74) *Attorney, Agent, or Firm* — Slater Matsil, LLP

(57) ABSTRACT

The present disclosure relates to a vehicle and associated method capable of effectively responding to a cut-in of a nearby vehicle in various road conditions. The method includes obtaining driving situation information; drawing an integrated lane by selectively applying one of a lanelink, a laneside, or a point level path (PLP) based on the obtained driving situation information; determining a cut-in target based on the integrated lane and a predicted path of each of at least one nearby vehicle; calculating a control point to be followed for driving control of an ego vehicle based on an intersection of a predicted path of the cut-in target and the integrated lane; generating a speed profile and a driving path based on the calculated control point; and performing driving control based on a parameter corresponding to the speed profile and the driving path.

14 Claims, 21 Drawing Sheets

VEHICLE AND METHOD OF CONTROLLING CUT-IN RESPONSE

CROSS-REFERENCE TO RELATED APPLICATIONS

This application claims the benefit of Korean Patent Application No. 10-2020-0186461, filed on Dec. 29, 2020, which application is hereby incorporated herein by reference.

TECHNICAL FIELD

Embodiments of the present invention relate to a vehicle capable of effectively responding to a cut-in of a nearby vehicle in various road conditions, and a cut-in response control method therefor.

BACKGROUND

Autonomous vehicles adopt an advanced driver assistance system (ADAS) to not only free drivers from simple tasks such as steering wheel and pedal operation while driving, but also to prevent accidents caused by the drivers' negligence in advance, so recently people's interest is increasing.

Such an autonomous vehicle generates a path using a section change line (Node), a lane center line (Lanelink), or a lane (Laneside) constituting a high-definition map, and executes autonomous driving control by following the path. Such a path is generally generated by reprocessing the vector data collected from the high-definition map through various function expressions and sequentially using each point of the vector data.

However, a standardized road shape was assumed such that a general lanelink existed in the center of a lane, the lanes were continuous, a lane width was constant, and a curvature was within a certain range. Therefore, in determining whether or not a nearby vehicle is a cut-in for changing a lane to a lane of ego vehicle, which is a driving lane of ego vehicle, there is a problem in that mis-determination and non-determination frequently occurs in the case where the lanelink is biased to one lane, the lane is discontinuous, the lane width is irregular, or there is a special section such as a U-turn section/roundabout.

SUMMARY

Embodiments provide a vehicle capable of effectively responding to a cut-in of a nearby vehicle in various road conditions, and a cut-in response control method therefor.

In particular, embodiments provide a vehicle capable of improving cut-in response and ride comfort by drawing a lane that can stably respond to various road types, and a cut-in response control method therefor.

The technical problems to be solved in the embodiments are not limited to the technical problems mentioned above, and other technical problems not mentioned will be clearly understood by those of ordinary skill in the art to which the embodiments belong from the description below.

In order to solve the above technical problem, the method of controlling a vehicle cut-in response according to an embodiment may include the steps of obtaining driving situation information; drawing an integrated lane-line by selectively applying one of a lanelink, a laneside, or a point level path (PLP), based on the obtained driving situation information; determining a cut-in target based on the integrated lane-line and a predicted path of each of at least one nearby vehicle; calculating a control point to be followed for driving control of an ego vehicle based on an intersection of a predicted path of the cut-in target and the integrated lane-line; generating a speed profile and a driving path based on the calculated control point; and performing driving control based on a parameter corresponding to the speed profile and the driving path.

In addition, the vehicle for performing a cut-in response control may include a convergence information generator to obtain driving situation information; a control parameter generator that draws an integrated lane-line by selectively applying one of a lanelink, a laneside, or a point level path (PLP), based on the obtained driving situation information, determines a cut-in target based on the integrated lane-line and a predicted path of each of at least one nearby vehicle, calculates a control point to be followed for driving control of an ego vehicle based on an intersection of a predicted path of the cut-in target and the integrated lane-line, and generates a speed profile and a driving path based on the calculated control point; and a driving controller to perform the driving control based on a parameter corresponding to the speed profile and the point level path.

In addition, the vehicle for performing a cut-in response control may include a convergence information generator to obtain driving situation information; a control parameter generator that draws an integrated lane by selectively applying a lanelink, a lainside, and a point level path (PLP) based on the obtained driving situation information, determines a cut-in target based on the integrated lane and a predicted path of each of at least one nearby vehicle, calculates a control point to be followed for driving control of an ego vehicle based on an intersection of a predicted path of the cut-in target and the integrated lane, and generates a speed profile and a driving path based on the calculated control point; and a driving controller to perform the driving control based on a parameter corresponding to the speed profile and the point level path.

The vehicle related to at least one embodiment configured as described above can effectively respond to the cut-in of nearby vehicle in various road conditions, thereby improving ride comfort.

In particular, according to embodiments, it is possible to stably respond to various road types by drawing an integrated lane and calculating a control point having continuity.

The effects obtainable in embodiments are not limited to the above-mentioned effects, and other effects not mentioned may be clearly understood by those of ordinary skill in the art to which the embodiments belong from the following description.

DETAILED DESCRIPTION OF ILLUSTRATIVE EMBODIMENTS

Figure 1:
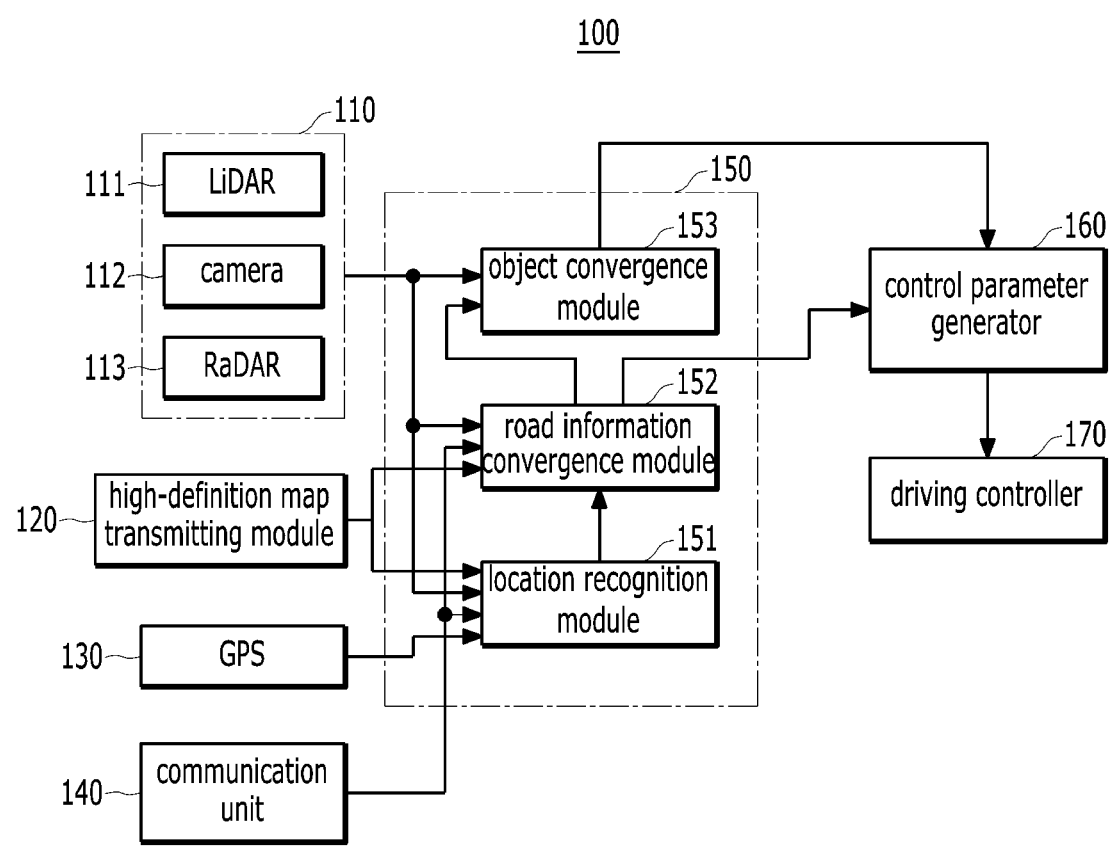
FIG. 1 shows an example of a vehicle configuration according to an embodiment.

Hereinafter, with reference to the accompanying drawings, embodiments will be described in detail so that those of ordinary skill in the art can easily implement them. However, the embodiments may be embodied in various different forms and is not limited to the embodiments described herein. And in order to clearly explain the embodiments in the drawings, parts irrelevant to the description are omitted, and similar reference numerals are attached to similar parts throughout the specification.

Throughout the specification, when a part "includes" a certain component, it means that other components may be further included, rather than excluding other components, unless otherwise stated. In addition, parts indicated with the same reference numerals throughout the specification mean the same components.

The embodiments propose drawing an integrated lane-line by effectively using one of a laneside, a lanelink, or a point level path (PLP), and determining a cut-in target by comparing a predicted path and a future location of a nearby vehicle. In addition, the embodiments propose calculating a control point based on the intersection of the predicted path of the determined cut-in target and an integrated lane-line, thereby stably responding to various road types.

FIG. 1 shows an example of a vehicle configuration according to an embodiment.

Referring to FIG. 1, a vehicle 100 according to an embodiment includes a recognition sensor 110, a high-definition map transmitting module 120, a GPS 130, a communication unit 140, a convergence information generator 150, a control parameter generator 160 and a driving controller 170.

It is apparent to those skilled in the art that each component shown in FIG. 1 is mainly illustrated with components related to embodiments, and fewer or more components may be included in an actual vehicle implementation. Hereinafter, each component will be described in detail.

The recognition sensor 110 includes a LiDAR 111, a camera 112, and a RaDAR 113, and may collect information on a driving road, information on the environment of driving road, and information on a nearby vehicle to provide recognition information.

The high-definition map transmitting module 120 provides a high-definition map around the vehicle 100.

The GPS 130 may receive a signal from a GPS satellite (not shown) or calculate the current location of the ego vehicle 100 using the received signal.

The communication unit 140 is a means for transmitting and receiving information with the inside and outside of the vehicle 100. For example, in-vehicle communication can be performed through a transceiver that supports vehicle communication protocols (CAN, CAN-FD, LIN, Ethernet, etc.), and external communication can be performed through common wireless communication protocols (3G/LTE/5G, etc.) or a modem supporting the V2X protocol, but is not necessarily limited thereto.

The convergence information generator 150 may include a location recognition module 151, a road information convergence module 152, and an object convergence module 153.

The location recognition module 151 may compare the recognition information received from the recognition sensor no, the current location information of ego vehicle received from the GPS 130, a high-definition map of nearby vehicle received from the high-definition map transmitting module 120, and the like, and generate the high-definition information of current location of ego vehicle and the reliability information of location recognition. The road information convergence module 152 may generate a high-definition map of environment of ego vehicle by using the high-definition information of current location of ego vehicle received from the location recognition module 151 and the high-definition map of environment of vehicle received from the high-definition map transmitting module 120. The object convergence module 153 may generate convergence object information by using the high-definition map of environment of ego vehicle received from the road information convergence module 152 and the recognition information. The convergence object information may refer to map information including the location and speed of an object, that is, a nearby vehicle other than the ego vehicle.

The control parameter generator 160 generates control parameters provided to the driving controller 170 by using the convergence object information received from the convergence information generator 150, and a detailed configuration and function will be described later.

The driving controller 170 may control the driving state (e.g., acceleration/deceleration, steering, braking, etc.) of the vehicle with the control value of the vehicle corresponding to the control parameter received from the control parameter generator 160.

Figure 2:
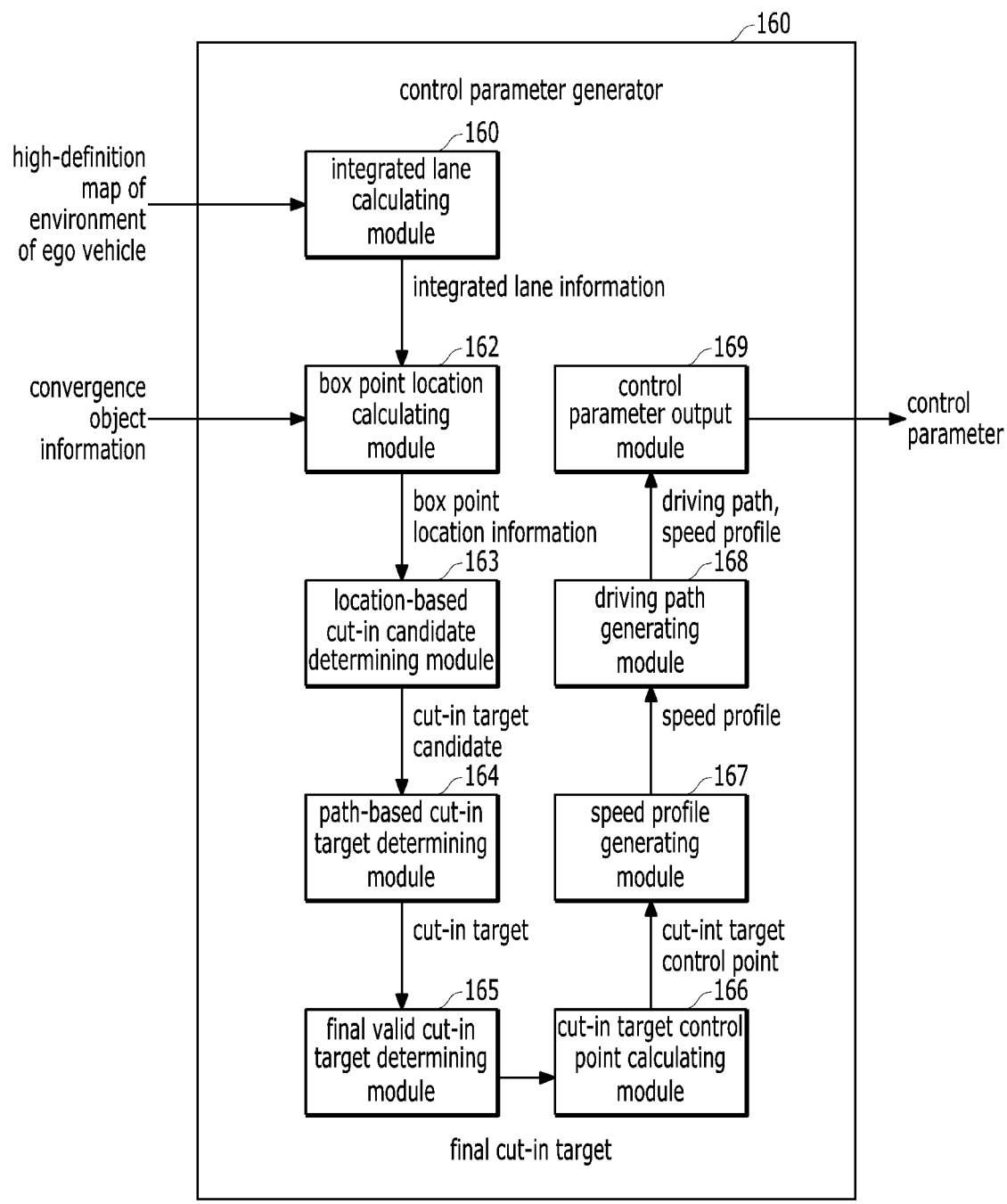
FIG. 2 shows an example of a configuration of a control parameter generator according to an embodiment.

FIG. 2 shows an example of a configuration of a control parameter generator according to an embodiment.

Referring to FIG. 2, the control parameter generator 160 according to an embodiment may include an integrated lane calculating module 161, a box point location calculating module 162, a location-based cut-in candidate determining module 163, and a path-based cut-in target determining module 164, a final valid cut-in target determining module 165, a cut-in target control point calculating module 166, a speed profile generating module 167, a driving path generating module 168, and a control parameter output module 169.

The integrated lane calculating module 161 may calculate a final lane to be used for the cut-in response determination, that is, an integrated lane by selectively using one of the lanelink, the laneside, or the PLP, according to the current driving situation based on the high-definition map of environment of ego vehicle received from the road information convergence module 152.

The box point location calculating module 162 may draw the internal location of the integrated lane of four vertices of a nearby object such as a nearby vehicle, that is, box point location information.

The location-based cut-in candidate determining module 163 may calculate a cut-in candidate target by determining an ego vehicle-based longitudinal location through the box point location information of the nearby object.

The path-based cut-in target determining module 164 may select a final cut-in target based on the predicted paths of the cut-in candidate targets.

The final valid cut-in target determining module 165 may finally determine the cut-in target by using traffic information (signal information of a traffic light, etc.) and the intersection information between the predicted paths.

The cut-in target control point calculating module 166 may calculate a control point to be followed for driving control of the ego vehicle when a cut-in target is selected on all types of roads including curved roads.

The speed profile generating module 167 may calculate a speed profile that is a set of target speeds for each time that the ego vehicle must follow for a follow-up control of control point.

The driving path generating module 168 may calculate a point level path (PLP) to be followed by the ego vehicle for lateral control according to deflection and path maintenance according to in-pass.

The control parameter output module 169 may output the parameters of each control element determined in the above-described manner to the driving controller 170.

Figure 3:
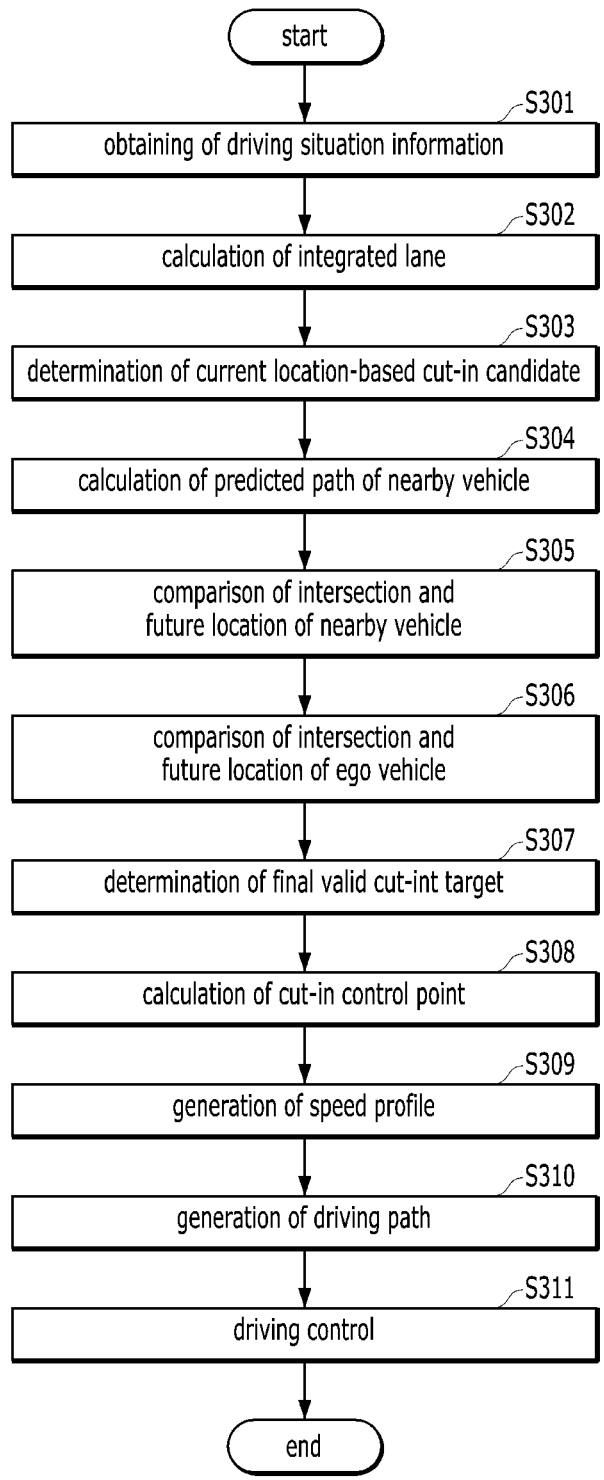
FIG. 3 shows an example of a control process of cut-in response according to an embodiment.

FIG. 3 shows an example of a control process of cut-in response according to an embodiment.

Referring to FIG. 3, first, driving situation information may be obtained in the convergence information generator 150 based on information obtained from at least one of the recognition sensor no, the high-definition map transmitting module 120, the GPS 130, and the communication unit 140 (S301). This process (S301) corresponds to a preparation process for selecting the nearby objects surrounding the lane of the ego vehicle as candidates in order to minimize the amount of computation of recognition sensor information on the nearby objects, and calculating detailed information on the corresponding candidates.

The integrated lane calculating module 161 of the control parameter generator 160 may calculate integrated lane information based on the driving situation information (S302).

The location-based cut-in candidate determining module 163 may determine the ego vehicle-based longitudinal location and calculate the cut-in candidate target through the box point location information of the nearby objects drawn by the box point location calculating module 162 (S303).

The path-based cut-in target determining module 164 may determine the cut-in target by calculating the predicted paths of the cut-in candidate targets (S304), comparing the future locations of the intersections of the predicted path and the integrated lane based on the predicted paths of the cut-in candidate targets (S305) and comprehensively considering the comparison result of the future location of the ego vehicle (S306).

The final valid cut-in target determining module 165 may filter unnecessary targets by using traffic information (signal information on traffic lights, etc.) and intersection information between the predicted paths (i.e., interaction between nearby vehicles), and determine the final cut-in target (S307).

The cut-in target control point calculating module 166 may calculate a control point to be followed for driving control of the ego vehicle when the cut-in target is selected on all types of roads including curved roads (S308). This calculation of the control point may play a very important role in the case of a curved road or in the case where only a part of the vehicle enters the lane of ego vehicle.

Thereafter, the speed profile generating module 167 may calculate a speed profile (S309), the driving path generating module 168 may calculate a point level path (PLP) (S310), and the driving control may be performed as the control parameter output module 169 generates the parameter of each control element to the driving controller 170 (S311).

Hereinafter, an integrated lane according to an embodiment will be described with reference to FIGS. 4 to 10.

Figure 4:
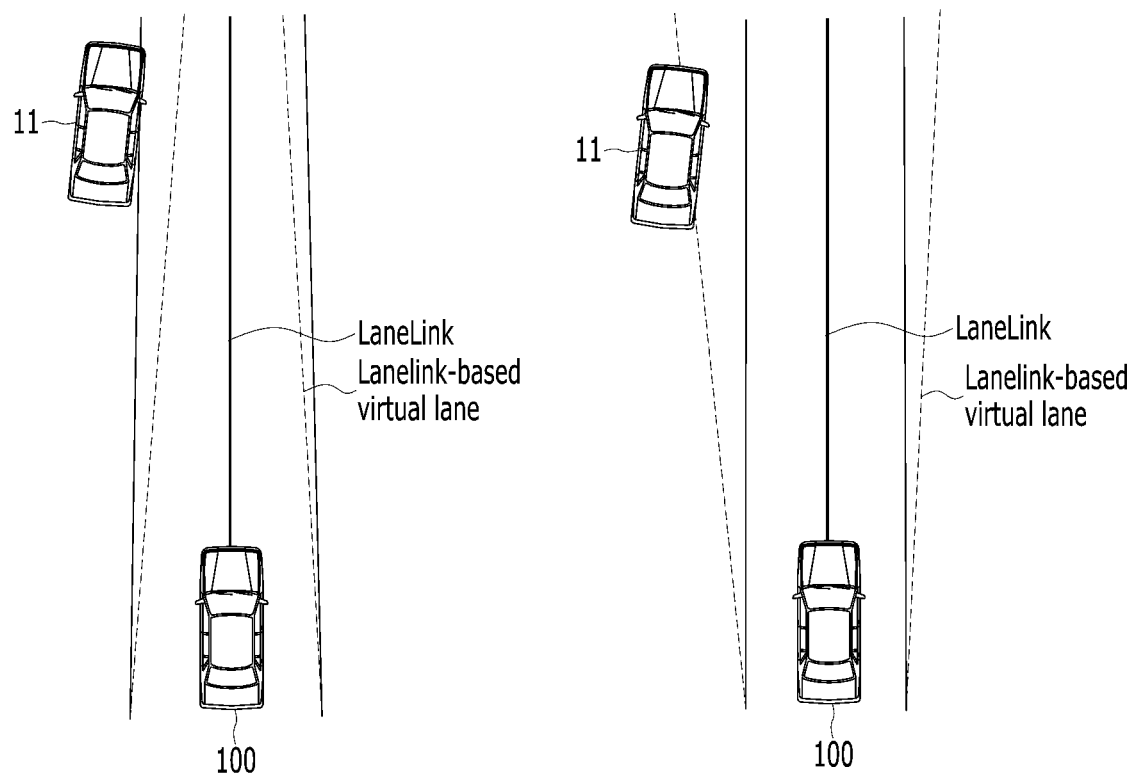
FIG. 4 is a diagram for explaining a case of erroneous detection and non-detection occurring when a lanelink-based virtual lane is used.

FIG. 4 is a diagram for explaining a case of erroneous detection and non-detection occurring when a lanelink-based virtual lane is used.

Although there is no significant difference with the naked eyes in a downtown, there are many cases where a lane width is not constant as shown on the right side of FIG. 4. For example, if the width at the location of the ego vehicle 100 is 3 m, but the lane width 50 m ahead is 3.3 m, it is not easy for the human eye to feel the change in the lane width. Here, when a virtual lane-line is drawn based on the lanelink, there is misdetection problem in that even though the other vehicle 11 does not invade the actual lane of the driving lane in which the ego vehicle 100 is driving, the deceleration control is performed because the other vehicle 11 crosses the virtual lane-line.

In addition, when the lane width is widened as shown on the left side of FIG. 4, there may be a situation in which even though the other vehicle 11 invades the lane of driving lane, the deceleration control is not performed because the lanelink-based virtual lane-line is not crossed, so an occupant feels it as undetected.

Figure 5:
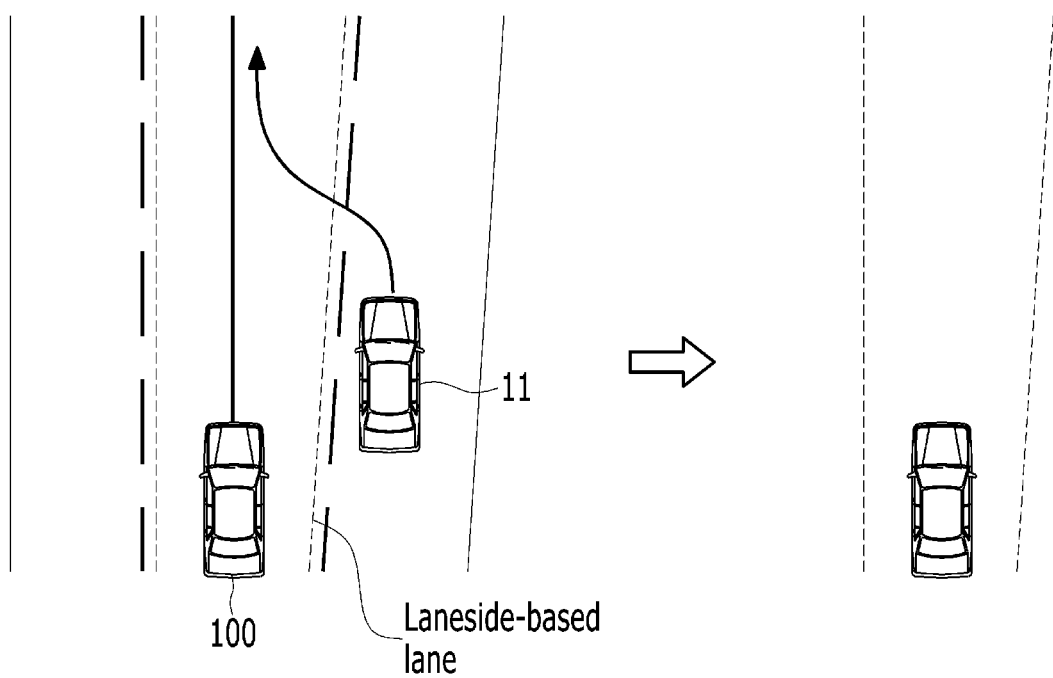
FIG. 5 shows an example of a laneside-based lane detection.

FIG. 5 shows an example of a laneside-based lane detection.

Since the occupant feels the ground truth for the cut-in target determination, it may be determined depending on whether or not the vehicle will cross the lane in a general lane section such as a downtown. Therefore, as shown in FIG. 5, if the lane width itself is larger than a safe margin for the vehicle to pass, it is preferable that the cut-in target is determined based on the laneside, that is, it is preferable that the integrated lane-line is calculated based on the laneside.

Figure 6:
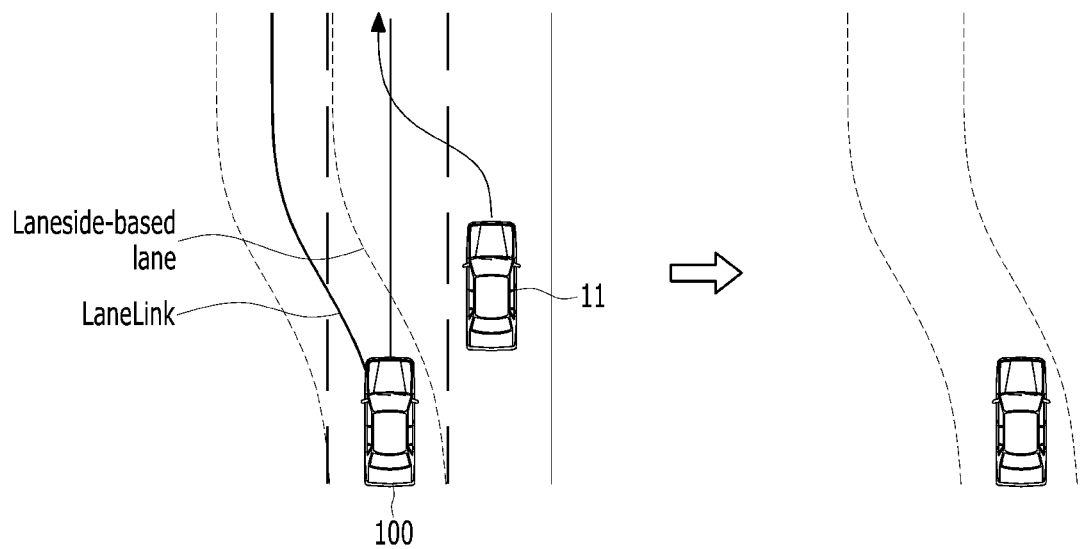
FIG. 6 shows an example of a lanelink-based lane detection.

FIG. 6 shows an example of a lanelink-based lane detection.

Referring to FIG. 6, a situation in which a pocket lane in which a lane discontinuity occurs starts from the left side of the ego vehicle 100 is illustrated. In such a pocket lane or a case where the laneside shape is irregular, it may be easier to use a virtual lane-line with a predetermined interval calculated based on the lanelink rather than the laneside-based determination.

Figure 7:
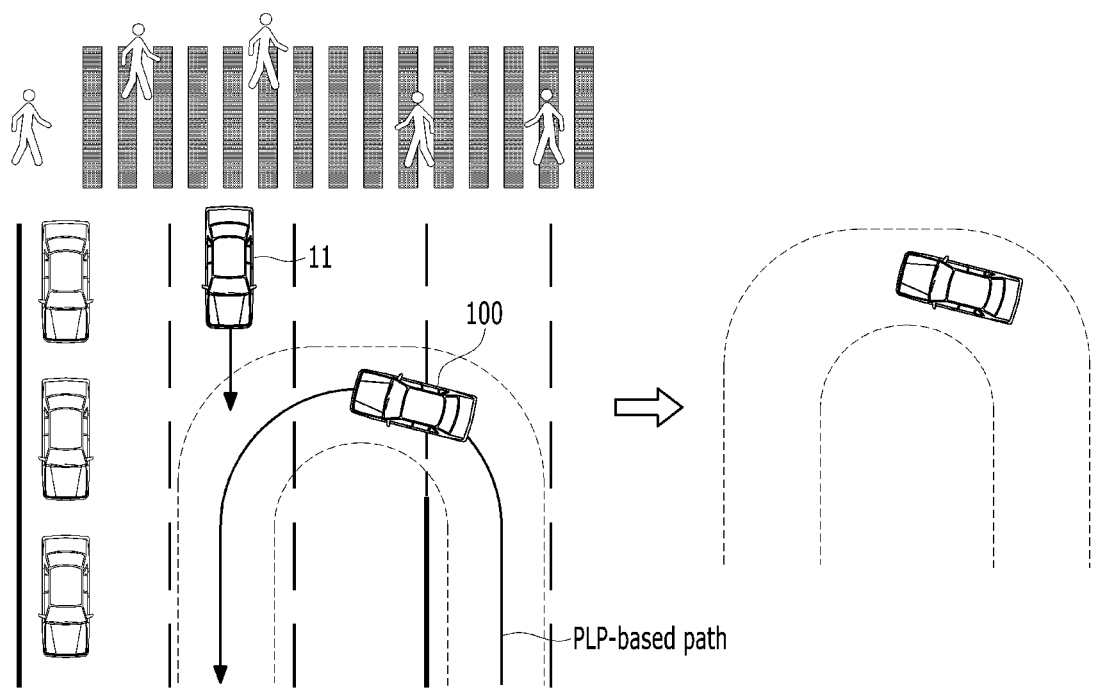
FIG. 7 shows an example of a PLP-based lane detection.

FIG. 7 shows an example of a point level path-based lane detection.

In situations such as a U-turn situation as shown in FIG. 7, inside an intersection, left/right turns, P-turn, or a wide lane in a bus stop area, there are cases in which the actual lane (laneside) does not exist or even if there is, the vehicle is driven without following the lane as it is.

Therefore, if the point level path (PLP) for follow-up control of the ego vehicle has been calculated in a previous frame, the cut-in target determination may be performed within a predetermined interval that the ego vehicle can pass to the left and right of the corresponding point level path. However, since the point level path is drawn at the final stage of the corresponding frame, information on the previous frame is used when the integrated lane-line is drawn based on the point level path. Therefore, in the stage in which the driving strategy is not fixed (the step of determining whether to change lanes or not), cut-in determination is performed based on the laneside or lanelink, or the determination in the corresponding frame may be withheld and the point level path-based determination of the previous frame may be finally confirmed in the next frame. In this case, a delay of one frame may occur, but considering that the determination delay due to the sensor's recognition inaccuracy is generally 3 frames, it is negligible.

In a situation in which the point level path is continuously changing (such as path change during a lane change), it is desirable to generate an integrated lane in an area in consideration of the direction and range of the point level path.

In summary, as the lane to be used in determining the cut-in, that is, the integrated lane, the high-definition map-based line may be given priority, and the point level path (PLP)-based integrated lane may be given a lower priority. This is because the point level itself may have errors so it cannot be a ground truth.

In the high-definition map-based lane, the lanelink-based integrated lane-line may be different from the actual visible lane, so the laneside-based integrated lane-line may have the highest priority, followed by the lanelink-based, and the point level path may be the lowest rank.

However, if the high-definition map has not been built or the high-definition map cannot be followed due to construction or an accident, it is apparent that the determination may be performed based on the lane detected by the camera 112.

Figure 8:
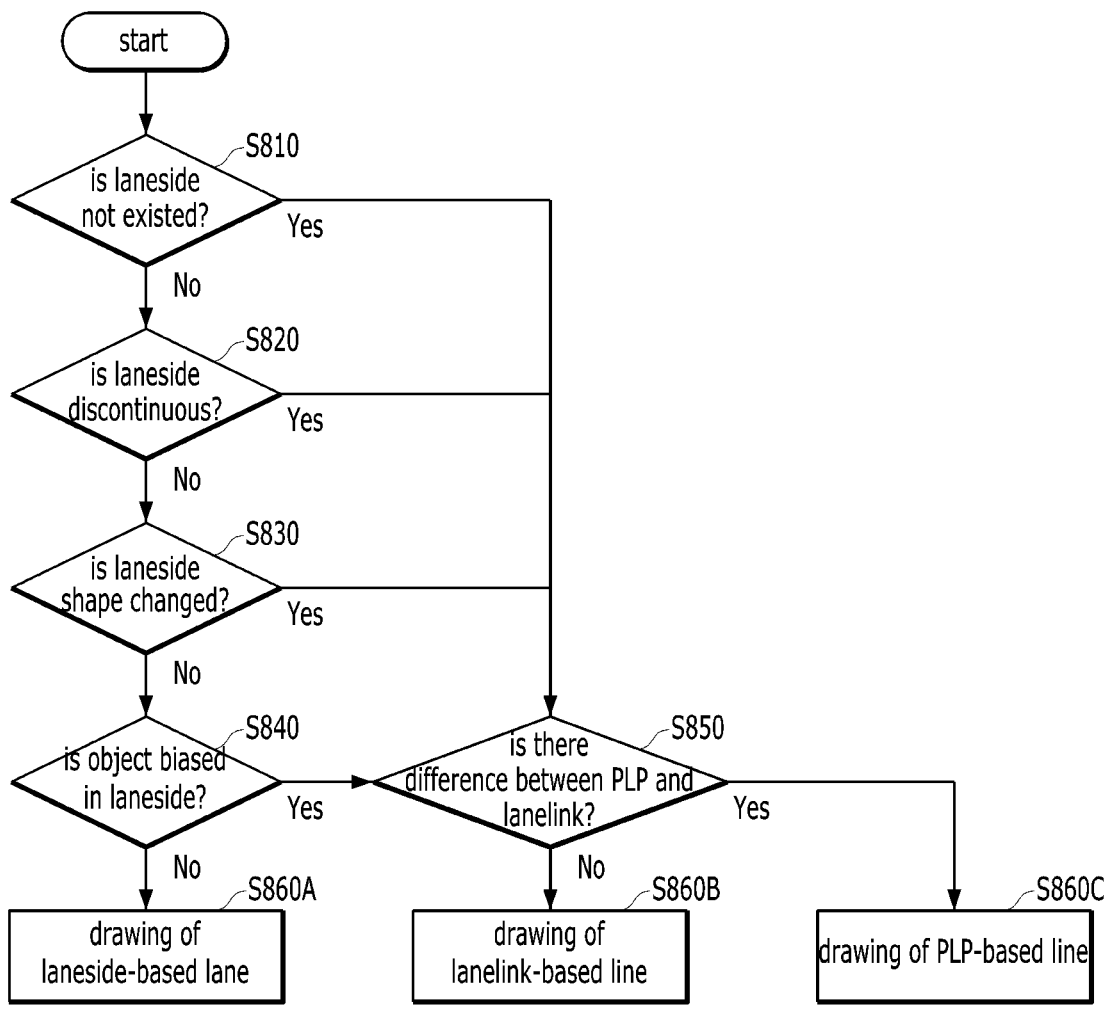
FIG. 8 shows an example of a process of determining an integrated lane according to an embodiment.

FIG. 8 is a flowchart illustrating a determination of basis information of the above-described integrated lane.

FIG. 8 illustrates an example of a determination process of an integrated lane according to an embodiment.

Referring to FIG. 8, the integrated lane-line calculating module 161 determines the lane based on laneside in a general situation (S860A) except the case where the laneside does not exist (Yes in S810), the laneside is discontinuous (Yes in S820), or the laneside shape is not constant (Yes in S830), or the object is biased in the laneside (Yes in S840).

On the other hand, if the laneside does not exist (Yes in S810), the laneside is discontinuous (Yes in S820), the laneside shape is not constant (Yes in S830), or the object is biased in the laneside (Yes in S840), the integrated lane-line calculating module 161 determines whether there is a difference between the point level path PLP and the lanelink (S850), and if the same or the difference is within a certain level (No in S850), the integrated lane-line may be drawn based on the lanelink (S860B). Here, the point level path PLP may be a path calculated from a previous frame.

Also, when there is a difference (more than a certain level) between the point level path (PLP) and the lanelink, the integrated lane calculating module 161 may draw the integrated lane based on the point level path (PLP) (S860C).

Apparently, in addition to the method described above with reference to FIG. 8, the drawing basis of the integrated lane may be determined in advance according to the road type (downtown, highway, etc.) and section (general section, lane variable section, special section, etc.) as shown in Table 1 below.

TABLE 1

| | General Section | Lane Variable Section | Special Section |
|---|---|---|---|
| Highway | Lanelink-based (a lane width is almost constant.) | Laneside-based (near tollgates, etc.) | PLP-based |
| Downtown | Laneside-based (a lane width is not conspicuous, but the change is severe.) | Lanelink-based (when the lane width of the pocket lane is too large, etc.) | PLP-based |

The classification criteria shown in Table 1 are exemplary, and it is apparent to those skilled in the art that various criteria different therefrom may be set.

Meanwhile, since the point level path (PLP) is determined at the last stage of the previous frame, the determination of the integrated lane needs to be performed after observing the driving strategy. The recognition information of the recognition sensor no is input in the form of a relative distance, and the high-definition map has absolute coordinates (WGS84, UTM coordinate system, etc.). Thus, in the case of an integrated lane that is fixed on the high-definition map for using, the integrated lane must be corrected (i.e., moved) according to the heading and location change of the ego vehicle. The necessity of such integrated lane correction will be described with reference to FIG. 9.

Figure 9:
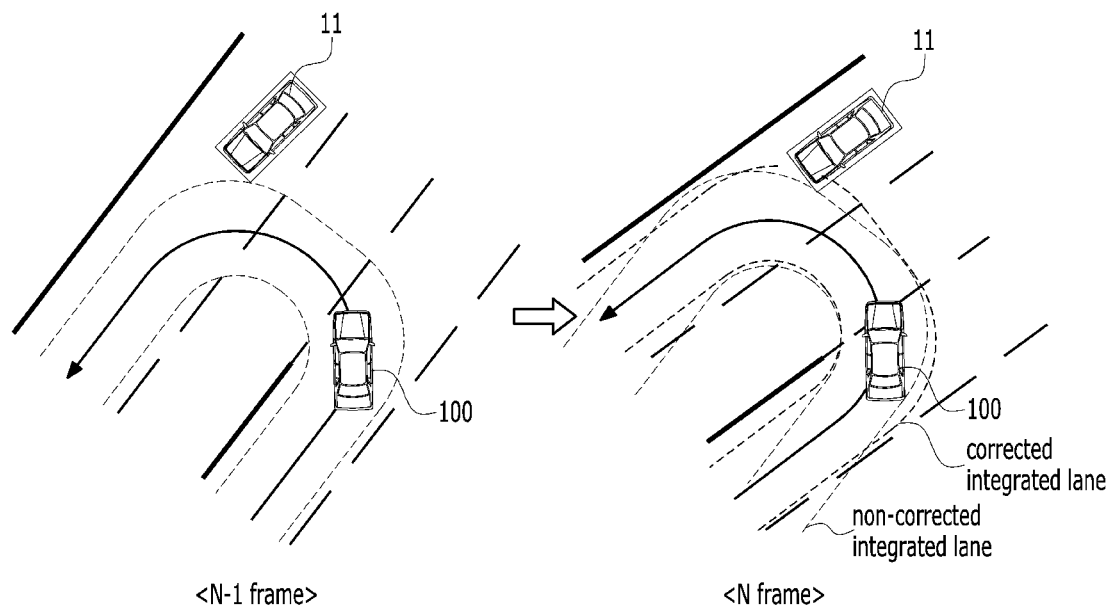
FIG. 9 is a diagram for explaining the necessity of correcting an integrated lane between frames.

FIG. 9 is a diagram for explaining the necessity of correcting an integrated lane between frames.

A previous (N−1) frame situation is shown on the left side of FIG. 9, and a current (N) frame situation is shown on the right side of FIG. 9, respectively.

If the integrated lane is not corrected according to the location change of the ego vehicle, as shown in the right side of FIG. 9, the heading and location change of the ego vehicle are not reflected during one frame, and thus an error of several tens of cm may occur. When determining the cut-in that requires resolution in the unit of cm, non-determination that the other vehicle 11 and the integrated lane do not intersect may be made based on the integrated lane before correction (uncorrected integrated lane) or the intersection of the other vehicle 11 and the integrated lane can be determined correctly through correction.

The correction method will be described with reference to FIG. 10.

Figure 10:
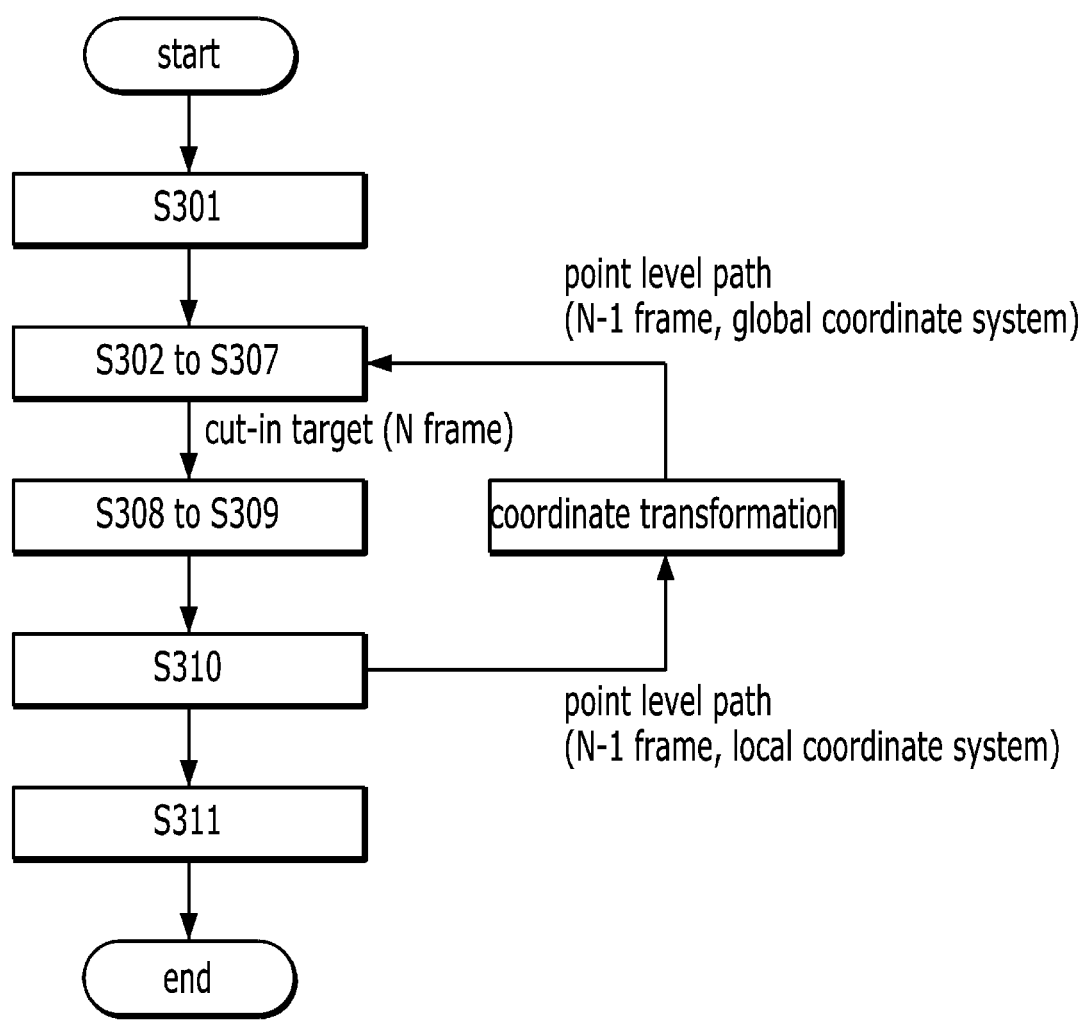
FIG. 10 shows an example of a process of correcting an integrated lane between frames according to an embodiment.

FIG. 10 shows an example of a process of correcting an integrated lane between frames according to an embodiment.

Referring to FIG. 10, in the determination of the cut-in target in the N frame (S302 to S307) in the control process of the cut-in response described above with reference to FIG. 3, the determination (S302 to S307) of the cut-in target in N frame may use the result of transforming the point level path (PLP) generated in N−1 frame from a local coordinate system to a global coordinate system through coordinate transformation. In other words, the integrated lane of the previous frame (N−1) may be fixed (stored) on the map as a global coordinate, and the integrated lane fixed (stored) on the global coordinate system may be used in the next frame (N). In this way, the relative location of the integrated lane can be normally corrected through the retransformation of the coordinate system in a turning situation such as a U-turn, P-turn, or lane change.

Hereinafter, a process of determining a final cut-in target (i.e., S303 to S307 of FIG. 3) will be described in more detail with reference to FIGS. 11 to 16.

In order to select a cut-in candidate vehicle based on the current location (S303), it is necessary to check the relative coordinates of the box points of each vehicle based on the integrated lane. This will be described with reference to FIG. 11.

Figure 11:
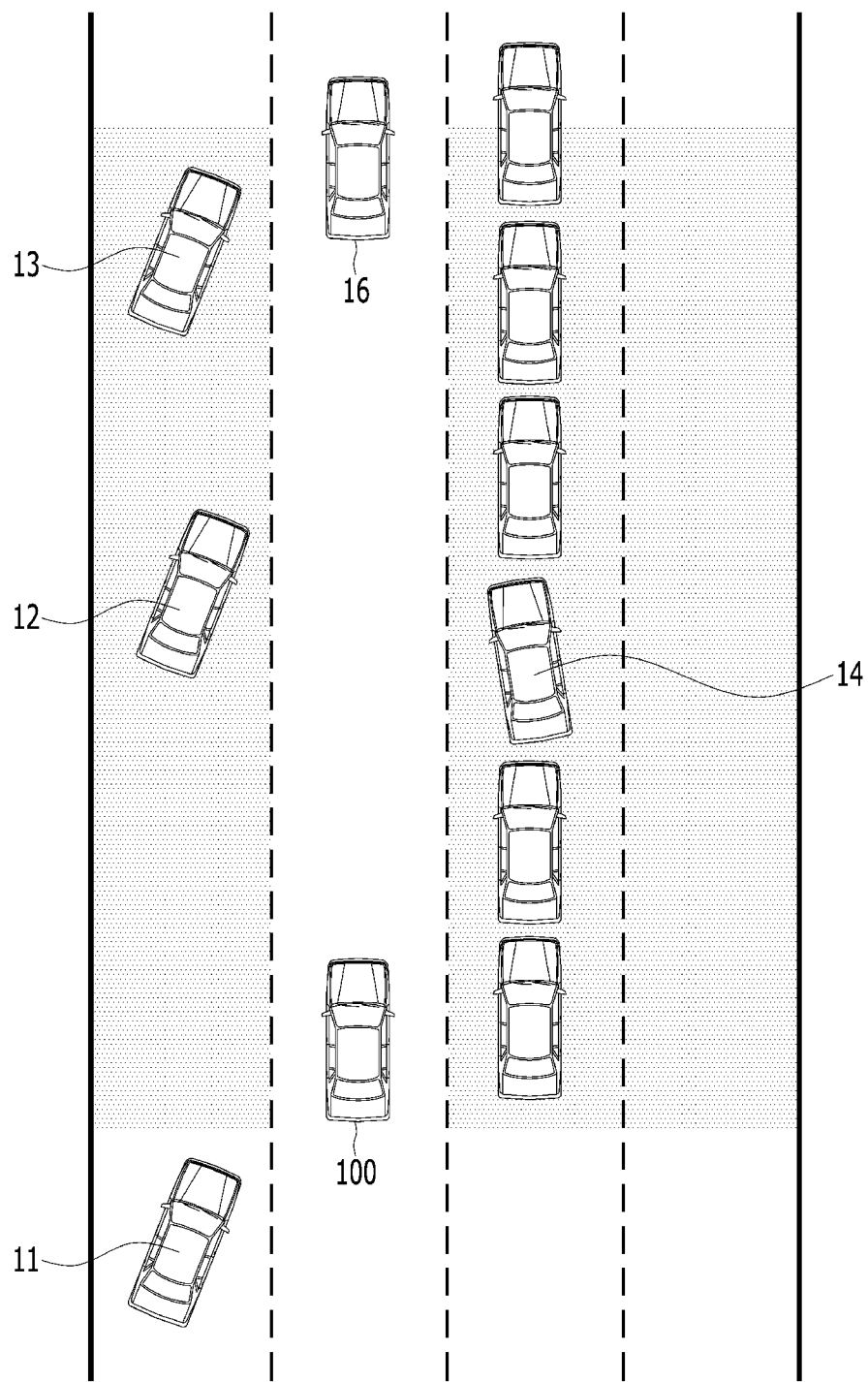
FIG. 11 is a diagram for explaining the selection of a cut-in candidate vehicle based on a current location according to an embodiment.

FIG. 11 is a diagram for explaining selection of a cut-in candidate vehicle based on a current location according to an embodiment.

Referring to FIG. 11, a first other vehicle 11 is predicted to cut-in to the driving lane of the ego vehicle 100. However, if deceleration control of the ego vehicle is performed by a vehicle that is too far behind during an actual vehicle test, it may be a factor that reduces ride comfort. Therefore, based on up to the rear bumper of the ego vehicle 100, that is, only the other vehicle located in front of the rear bumper of the ego vehicle 100 may be determined as a target to be determined. Afterwards, if the first other vehicle 11 wants to actually cut-in, it will go ahead of the rear bumper of the ego vehicle 100, so there is no problem in actual determination.

A second other vehicle 12 may be normally determined as a cut-in candidate.

In the case of a third other vehicle 13, the other vehicle 16 occupies the cut-in target lane (that is, the driving lane of the ego vehicle 100), so even though the direction is toward the driving lane, actually entering within T seconds (determination reference time) is physically impossible so the third other vehicle 13 may be excluded from the candidate.

Even in the case of a fourth other vehicle 14, since the inter-vehicle distance sufficient for the cut-in in front of the fourth other vehicle 14 is not secured and thus the cut-in of the fourth other vehicle 14 is not physically possible and may be excluded from the candidate. Apparently, when the inter-vehicle distance is secured later, it may be determined again whether the fourth other vehicle 14 is excluded from the candidate.

Next, the calculation of the predicted path of a nearby vehicle will be described with reference to FIGS. 12 and 13.

Figure 12:
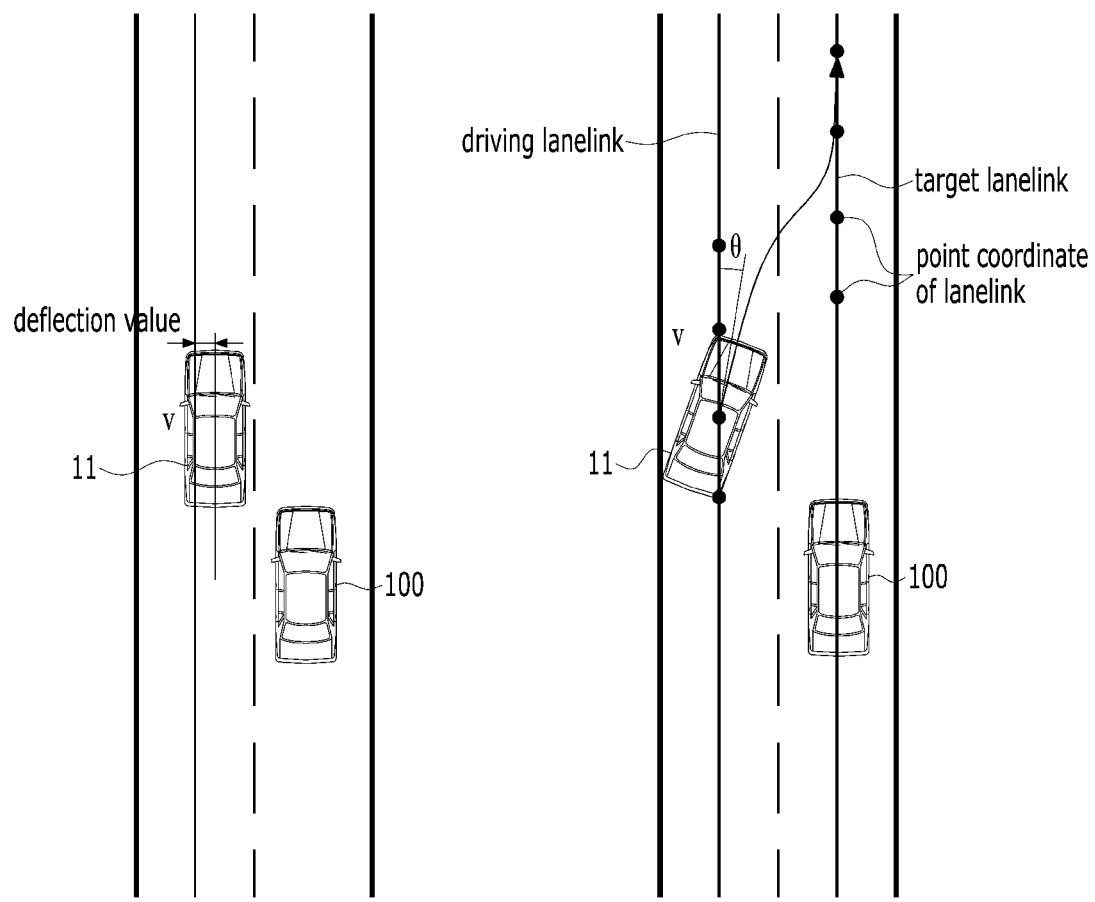
FIG. 12 is a diagram for explaining a parameter for generating a predicted path according to an embodiment.

FIG. 12 is a diagram for explaining a parameter for generating a predicted path according to an embodiment.

Referring to the left side of FIG. 12, a vehicle speed v for each vehicle and a deflection value (a lateral distance from the center of the lane to the center of the vehicle) of the other vehicle 11 are considered to generate the predicted path.

In addition, as shown on the right side of FIG. 12, the predicted path is generated in consideration of the driving direction (i.e., the heading angle θ) of the other vehicle 11, the set of point coordinates of each of the driving lanelink and the target lanelink of the other vehicle 11, and lane information.

When each of the above parameters is obtained, the path-based cut-in target determining module 164 may generate a predicted path for each cut-in target candidate determined by the location-based cut-in candidate determining module 163, based on non-training or dynamics and high-definition map information training.

When generating the predicted path for the other vehicle using a non-training technique, the path-based cut-in target determining module 164 may determine an expected location of the other vehicle for each frame in consideration of the inter-vehicle interaction.

When the non-training technique is used, the expected output path or lane change completion time may be calculated in the form of a table with respect to the input parameter set of the other vehicle.

In this case, by using a pre-stored predicted path or a time required for lane change for each parameter set, a mapping can be performed to follow a pre-planned mathematical model (N-th Bezier curve, 3rd Poly, etc.) during the corresponding required time. An example of a mathematical model is shown in FIGS. 13A and 13B.

Figure 13A:
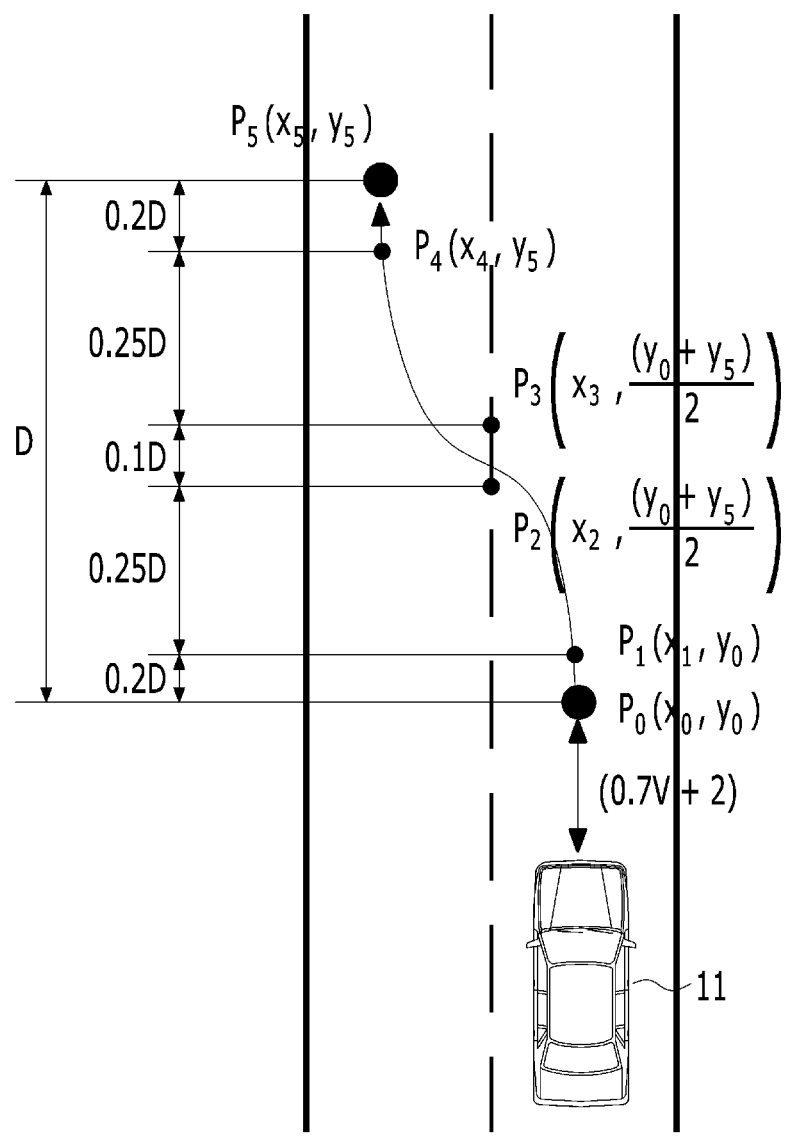
FIG. 13A shows an example of a curve-based prediction for generating a predicted path according to an embodiment.
Figure 13B:
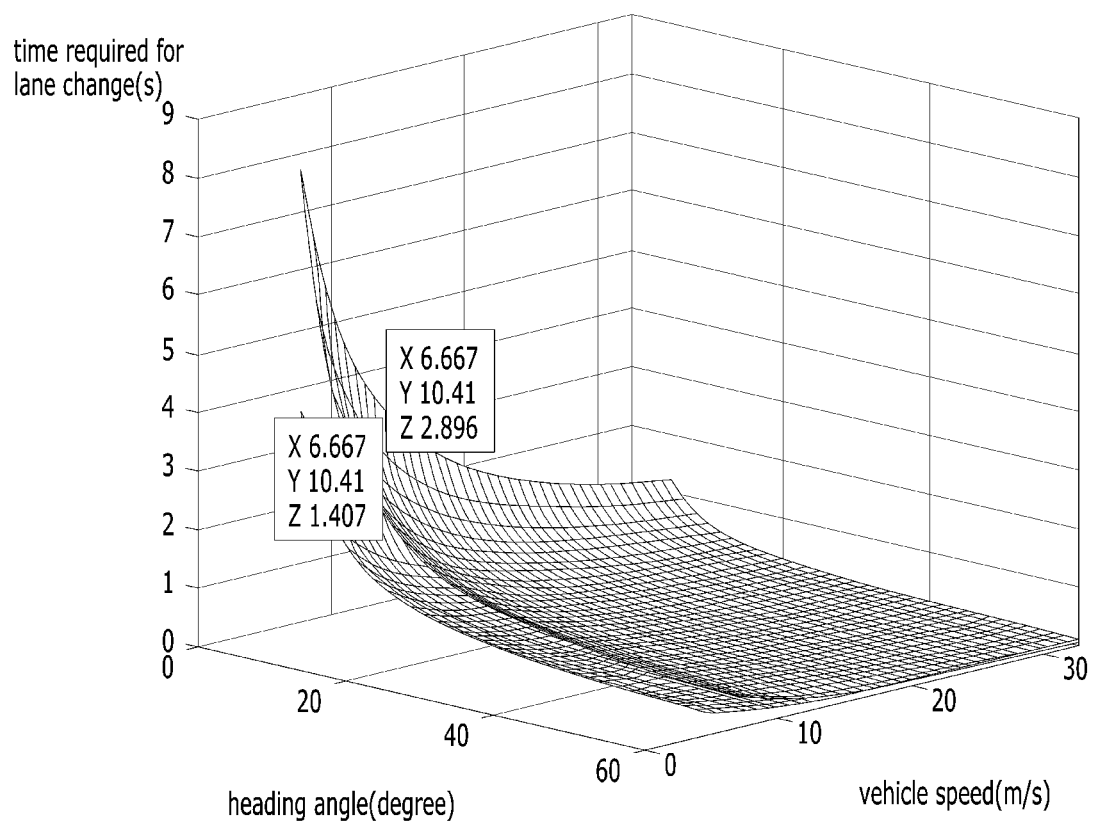
FIG. 13B shows an example of the time for lane change that is modeled based on a deflection value of a nearby vehicle.

FIG. 13A shows an example of a curve-based prediction for generating a predicted path according to an embodiment, and FIG. 13B shows an example of the time for lane change that is modeled based on a deflection value of a nearby vehicle.

FIG. 13A shows a modeling form of a predicted path based on a 5th Bezier curve with respect to the other vehicle, and FIG. 13B shows an example of modeling the time required for lane change in the form of a mesh plot when the deflection value of the other vehicle is 0.8 meters.

In the above-described mathematical modeling method, in addition to the parameters described with reference to FIG. 12, a coordinate history set, a current velocity/acceleration, matching sensor information, a high-definition map, a past high-definition map matching history, and the like may be further considered.

Apparently, the calculation of such a predicted path can be performed by training the above-described parameter set with a deep learning parameter and replacing it with a time-series forecasting problem such as a Convolutional Neural Network (CNN) or Long-Short Term Memory Network (LSTM). In addition, the driving intention of the other vehicle and the time required for lane change can have improved reliability not only through a one-time determination but also through observation of a plurality of samples.

On the other hand, when an expected lane is drawn based on the training of the dynamics and high-definition map information training, the training result can be used directly as time-series location information, and only the time required for lane change is partially trained, and the actual predicted path can be mapped to follow the above-described mathematical model (N-th Bezier curve, 3rd Poly, etc.) for using. When training the dynamics information and high-definition map information of the other vehicle, a neural network for predicting the time-series data of CNN and LSTM is generally used, but it is not limited to this, and it will be apparent to those skilled in the art that any neural network can be used as long as it predicts a predicted path or the time required for lane change.

When the predicted path is determined for each cut-in target candidate, the cut-in determination may be performed based on future locations of the ego vehicle and the other vehicle. This will be described with reference to FIG. 14.

Figure 14:
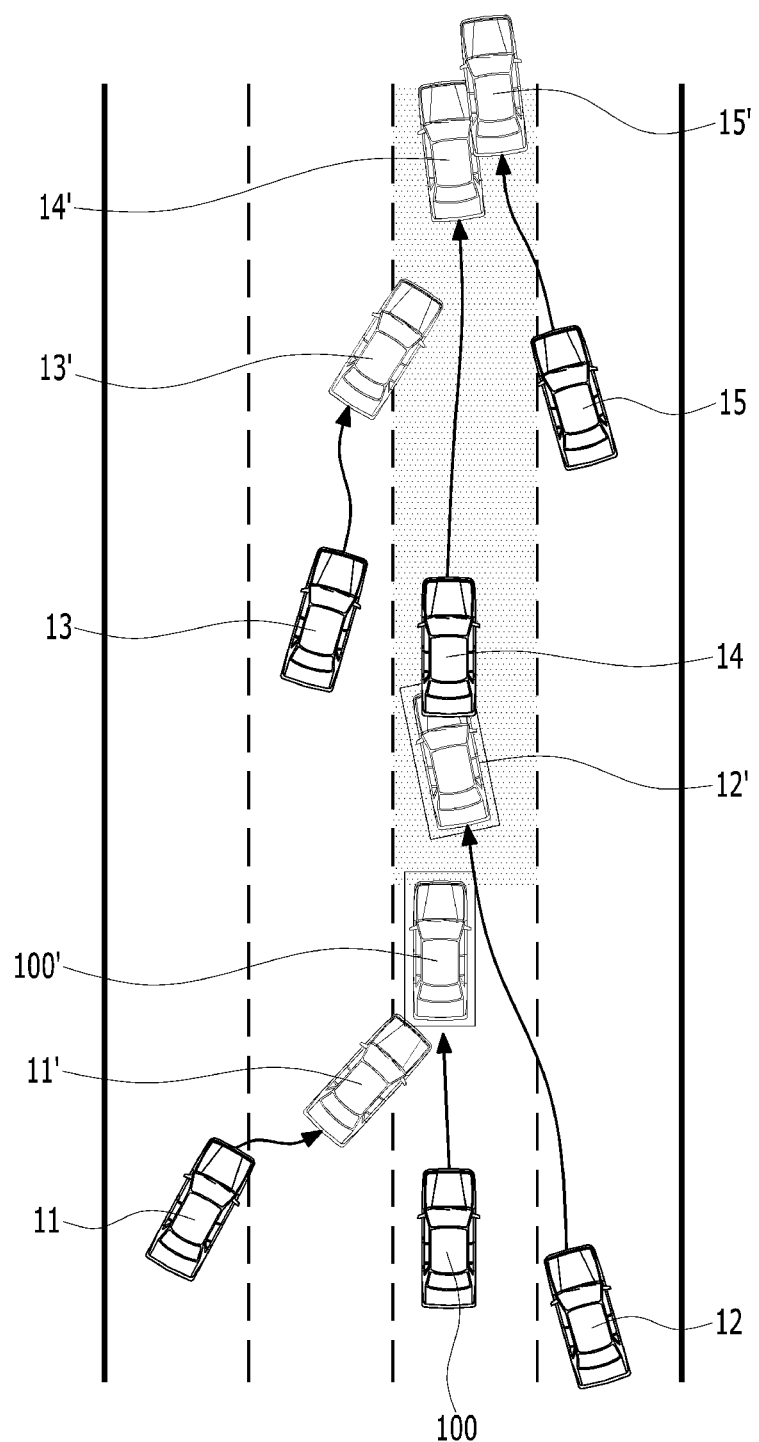
FIG. 14 shows an example in which cut-in determination is performed based on a future location by a predicted path according to an embodiment.

FIG. 14 shows an example in which a cut-in determination is performed based on a future location by a predicted path according to an embodiment.

When determining the cut-in, the expected location of the cut-in target candidate as well as the expected location of the ego vehicle should be considered together. That is, when determining the cut-in, it needs to organically consider the expected location of the nearby vehicles and the expected location of the ego vehicle. In the case of FIG. 14, the number of vehicles that finally enter the driving lane of the ego vehicle 100 after T seconds based on the predicted path is a total of 5 vehicles from the first other vehicle 11 to the fifth other vehicle 15.

When the ego vehicle 100 continues to drive on the driving lane, the cut-in target candidate that is substantially a threat becomes the second other vehicle 12, and thus the second other vehicle 12 may be determined as the cut-in target.

The reason is that the second other vehicle 12 is under consideration because the second other vehicle 12 is behind the ego vehicle 100 at the present time but it is in front of the rear bumper, and the location 12' after T seconds is in front of the location 100' of the ego vehicle.

In addition, in the case of the first other vehicle 11, although it is ahead of the ego vehicle 100 at the present time, it is not a threat because the location if after T seconds is the rear of the ego vehicle 100'. However, even if the location if after T seconds is the rear of the ego vehicle 100', there may be a case where a collision may occur within T seconds because the speed is variable, but since it is recalculated every frame, this case may be reclassified as a threat in the next frame.

In the case of the third other vehicle 13, it is located a considerable distance ahead of the ego vehicle 100, and the fourth other vehicle 14 is located more forward than the third other vehicle 13, so all of them are excluded from the candidate.

The fifth other vehicle 15 is also excluded from the candidate for the same reason.

On the other hand, with respect to the second other vehicle 12 that is the cut-in target, since the location 12' after T seconds becomes the adjacent front of the location 100' of the ego vehicle, the risk deceleration response implementation may be determined. In the case of the third to fifth other cars 13, 14, and 15, normal deceleration response can be performed rather than a dangerous deceleration response. That is, the cut-in deceleration response may be performed based on the nearest cut-in target in future.

Next, an operation of the final valid cut-in target determining module 165 will be described with reference to FIGS. 15 and 16.

Figure 15:
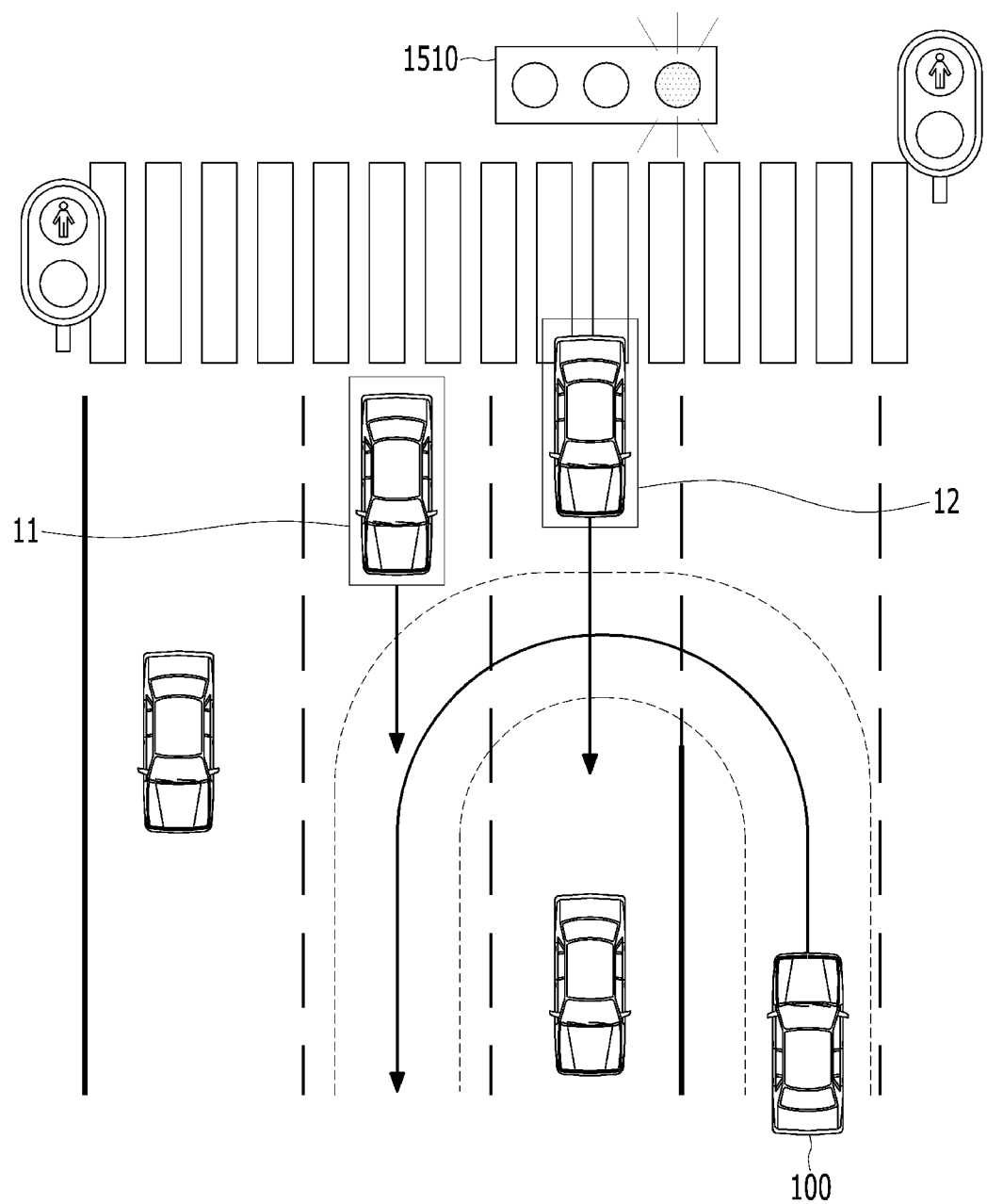
FIG. 15 shows an example of verification of a signal-based valid target according to an embodiment.

FIG. 15 shows an example of verification of a signal-based valid target according to an embodiment.

When driving based on a signal of a traffic light at an intersection, etc., the ego vehicle 100 does not drive along the path in the case of other than the designated signal. For example, as shown in FIG. 15, when waiting for a U-turn, the ego vehicle 100 does not proceed to the point level path corresponding to the U-turn in signals other than signals that allow U-turns (a left turn signal, a walking signal, etc. depending on an intersection).

Therefore, in all signals other than the designated signal, if the cut-in targets 11 and 12 to the integrated lane are determined and braked, there is a problem in that even progress to the entry point may be blocked due to unnecessary braking. In order to prevent such a problem, it is necessary to additionally verify the valid information of the targets determined to be cut-in according to the signal. The final valid cut-in target determining module 165 may apply a traffic signal to the determined cut-in target to verify validity according to whether or not the ego vehicle 100 actually proceeds. However, when the final valid cut-in target determining module 165 performs filtering on the cut-in targets by itself, it is impossible to respond to a vehicle driving in violation of a signal, so it can be processed as 'an invalid vehicle by a signal'.

Figure 16:
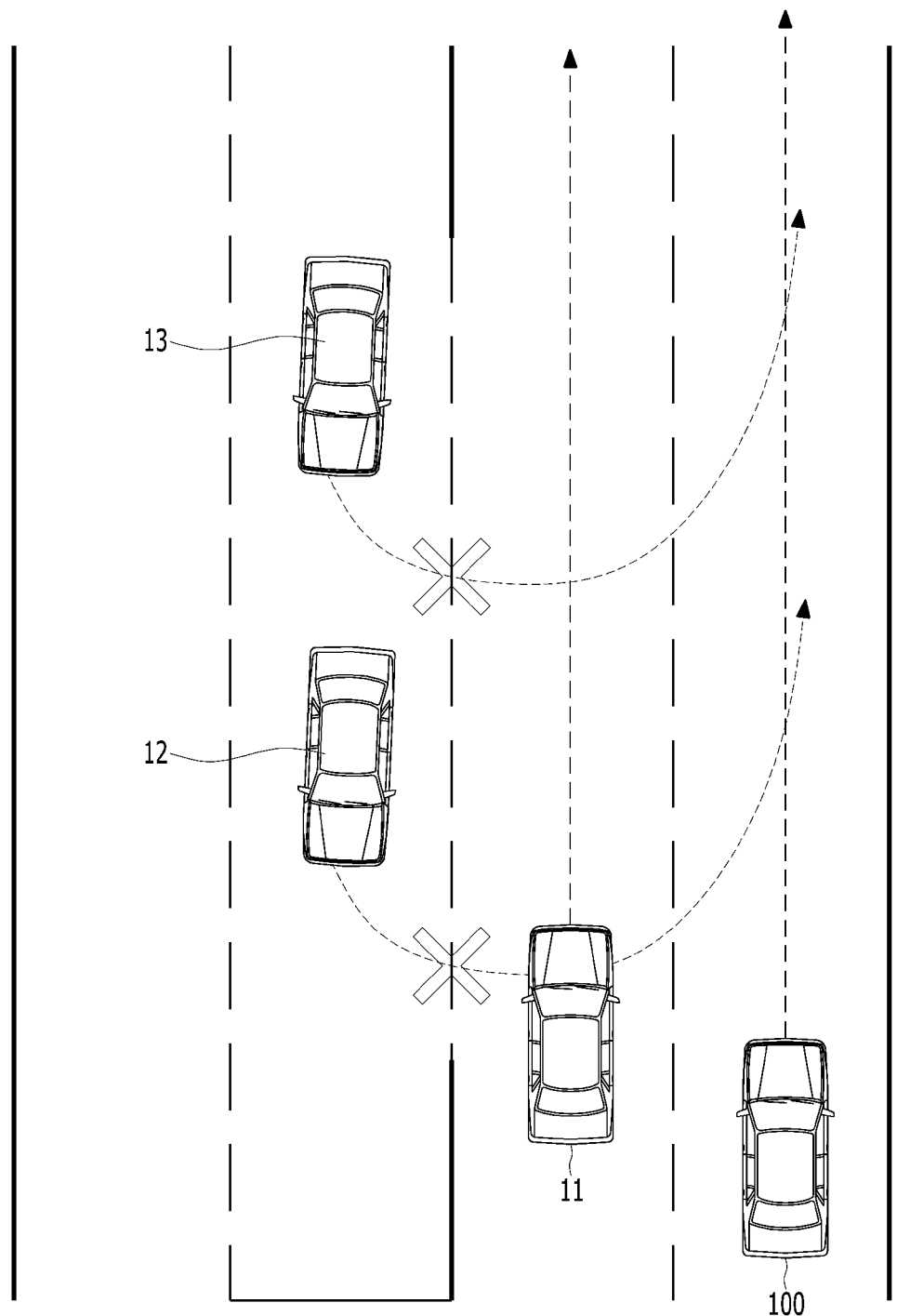
FIG. 16 shows an example of verification of a predicted path intersection-based valid target according to an embodiment.

FIG. 16 shows an example of verification of predicted path intersection-based valid target according to an embodiment.

Since the predicted path is mainly determined by the behavior of the other vehicles, there may be a case in which the interaction between the other vehicles is not reflected. Therefore, if a collision occurs between predicted paths, some or all vehicles may stop and may not drive along the predicted path.

For example, as shown in FIG. 16, in the case of the vehicles 12 and 13 making U-turns, the U-turn will not be made when they intersect with the predicted path of the vehicle 11 going straight ahead adjacent to the center line. That is, when the other vehicle 11 is driving together around the path of the ego vehicle 100 and the predicted paths of the other vehicles 12 and 13 are cut-in situations with respect to the ego vehicle 100, the other vehicles 12, 13 may be excluded from the cut-in target in the case where the predicted path is blocked by the other vehicle 11.

As a result, as described above with reference to FIGS. 15 and 16, for the cut-in target determined by the path-based cut-in target determining module 164 through traffic signals or determination of whether there is an intersection between predicted paths of the other nearby vehicles, the final valid cut-in target determining module 165 performs the valid verification, so the final cut-in target may be determined.

Hereinafter, an operation of the cut-in target control point calculating module 166 will be described with reference to FIGS. 17 to 20.

The control point or the control target point may mean a reference point in order to perform longitudinal control with respect to the cut-in target. For example, in an in-pass target, the distance to the rear center of the bumper and the speed of the in-pass target may be one reference point. However, when selecting the cut-in target, the selection of the control point may not be easy because the current location of the cut-in target and the future location where the predicted path intersects the integrated lane are also considered. Therefore, it is necessary to select the control point in consideration of the continuous change from the initial location of the cut-in target to the point in time when the cut-in target invades the integrated lane in the future.

Even in the process of the cut-in vehicle entering the in-pass area, it is preferable that the control points are selected to be continuous. This is because, if there is a discontinuity of the control points, it may cause sudden braking or rattling of the ego vehicle. To this end, the predicted path, the intersection of the other vehicle box and the integrated lane, the shortest point (i.e., the orthographic point) of the box points in the integrated lane on the lane of the ego vehicle may be selected as the control point.

Figure 17:
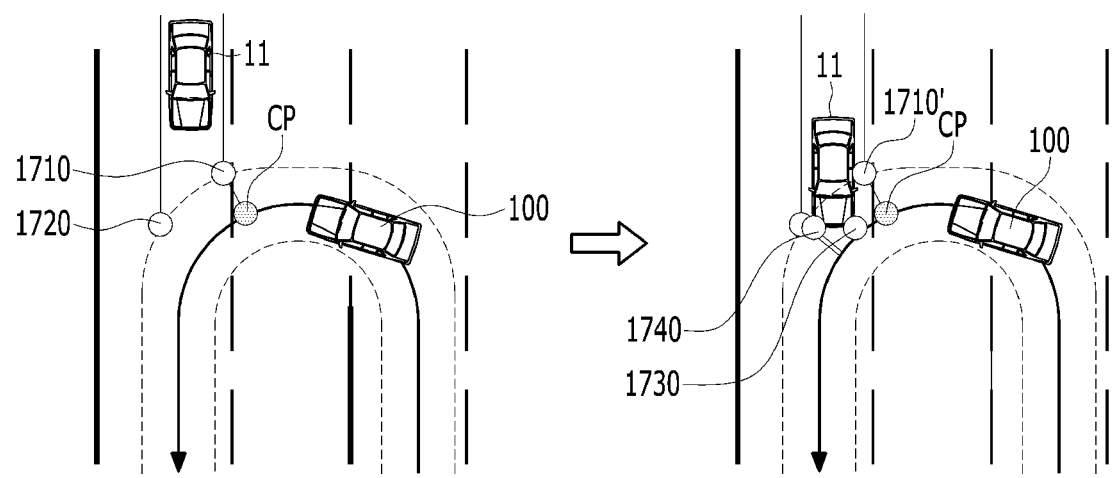
FIG. 17 shows an example of a control point selection in a U-turn path according to an embodiment.

FIG. 17 shows an example of a control point selection in a U-turn path according to an embodiment.

Referring first to the left side of FIG. 17, in the U-turn situation of the ego vehicle 100, the intersections 1710 and 1720 of the predicted path of the cut-in target 11 and the integrated lane are calculated, and among the orthographic points of the intersections 1710 and 1720, the orthographic point having the shortest distance from the ego vehicle 100 on the lane of the ego vehicle may be selected as the control point CP.

Thereafter, as the cut-in target 11 approaches the lane of the ego vehicle as driving proceeds, it converges to the first intrusion point at the actual entry point.

For example, on the right side of FIG. 17, immediately after the intrusion of the cut-in target 11 into the lane of the ego vehicle, because among the orthographic points of the intersection 1710' of the integrated lane and the box and the box points 1730 and 1740 in the integrated lane, the shortest point on the lane of the ego vehicle, that is, the control point CP, is the same as the first intrusion point 1710 of the cut-in target 11, according to the control point reference of the in-pass vehicle, it can be seen that the continuity of the control points is guaranteed even in the process of switching from the cut-in target to the in-pass target.

The deflected target, which will not invade the own lane, performs lateral control instead of longitudinal control, so it does not cause sudden braking or rattling. However, since the deflected target that will invade the lane of the ego vehicle will be determined as the cut-in target, continuity may be guaranteed as described above. This will be described with reference to FIG. 18.

Figure 18:
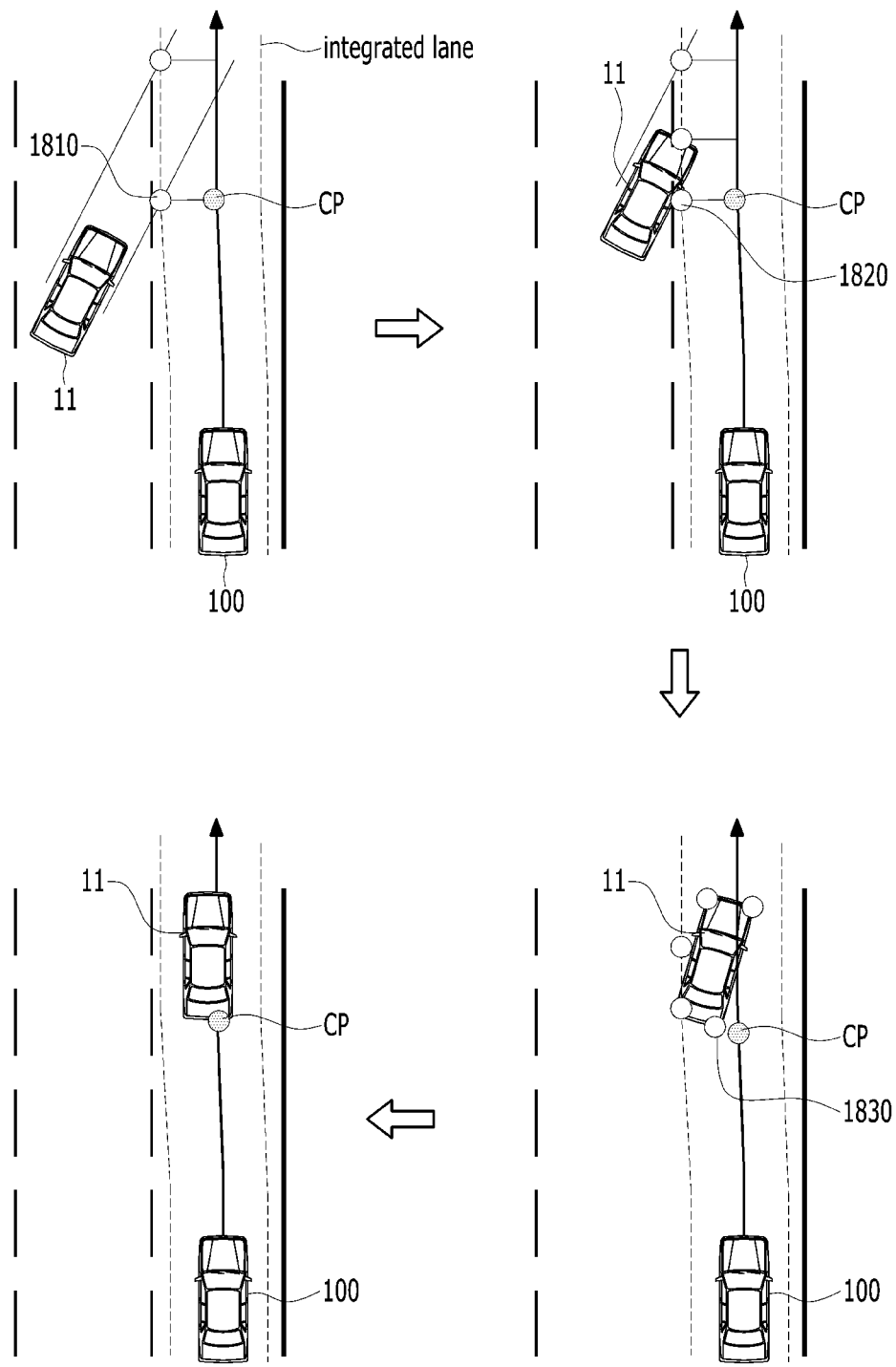
FIG. 18 shows an example of a control point selection in a straight path according to an embodiment.

FIG. 18 shows an example of a control point selection in a straight path according to an embodiment.

Referring to the upper left of FIG. 18, in a situation where the ego vehicle 100 is going straight, the intersection 1810 of the predicted path of the cut-in target 11 and the integrated lane is calculated, and among the orthographic points of the intersection 1810, the orthographic point having the shortest distance from the ego vehicle 100 on the lane of the ego vehicle may be selected as the control point CP.

In a situation such as the upper right of FIG. 18 as the driving progresses further, the orthographic point of the intersection 1820 of the integrated lane and the box has the shortest distance on the lane of the ego vehicle, and thus is selected as the control point CP.

Next, in a situation such as the lower right of FIG. 18, in the integrated lane, the orthographic point of the rear box point 1830 of the cut-in target 11 has the shortest distance on the lane of the ego vehicle, and thus is selected as the control point CP.

In addition, it can be seen that the continuity of the control point CP is guaranteed even in the straight path as the cut-in target is converted to the in-pass target as shown in the lower left of FIG. 18.

In addition, since the deflected target that has already invaded the lane of the ego vehicle but has not been determined to be in-pass follows the same control point calculation criteria as in-pass, the continuity of the control point may also be guaranteed in this case.

On the other hand, when the heading of the other vehicle is unstable due to inaccuracy of recognition information in the selection of the control point, the predicted path may be change, and there is a risk of repeating the determination as a cut-in target and then releasing it. In this case, in order to solve the rattling of the ego vehicle, it may determine the longitudinal control reflection ratio of the cut-in target by calculating the progress rate of entering the lane of the ego vehicle even for the cut-in target. This will be described with reference to FIG. 19.

Figure 19:
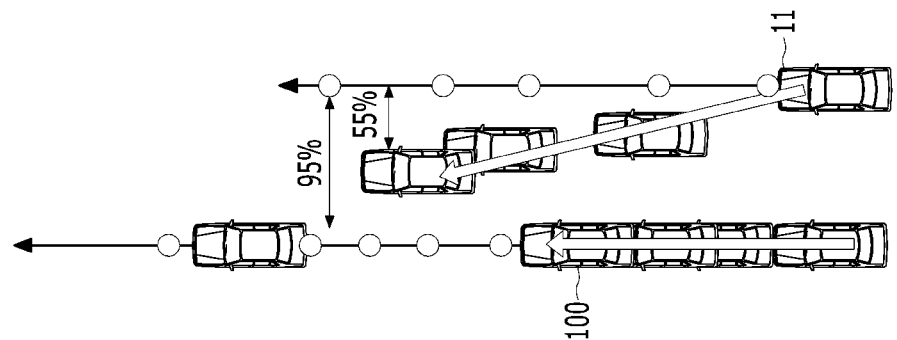
FIG. 19 shows an example of determining a progress rate of entering the lane of ego vehicle by the other vehicle according to an embodiment.
Figure 19:
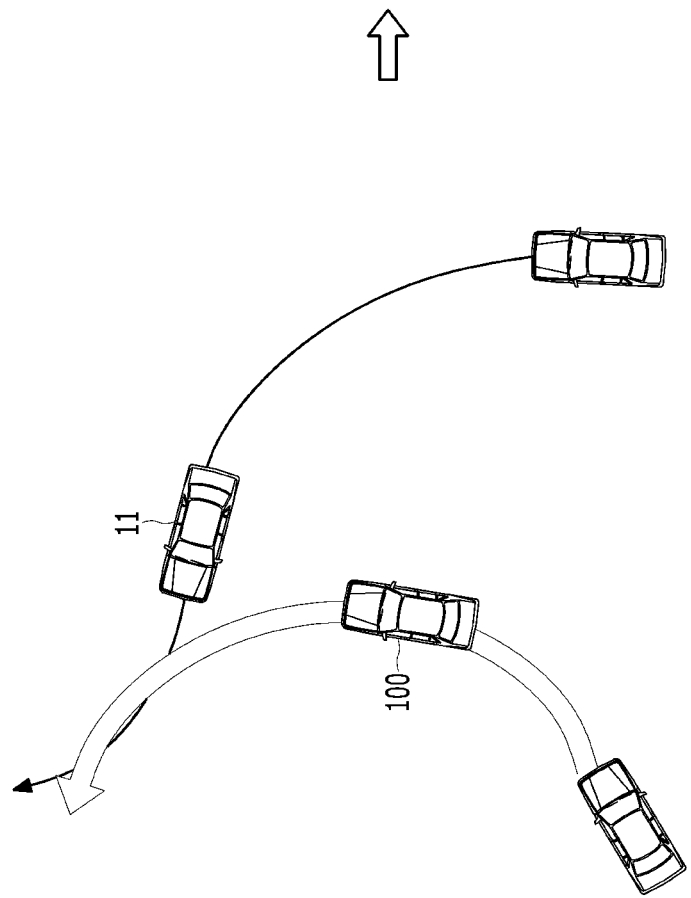

FIG. 19 shows an example of determining a progress rate of entering the lane of the ego vehicle by the other vehicle according to an embodiment.

Referring to the left side of FIG. 19, when the other vehicle 11 approaches the ego vehicle 100 in the lateral direction and is determined as the cut-in target, the progress rate of entering the lane of the ego vehicle by the other vehicle may be calculated as shown in the right side of FIG. 19, in order to gradually perform the longitudinal control according to the ratio of approaching the lane of the ego vehicle in the lateral direction. For example, when entering the lane of the ego vehicle from the initial position by 50%, the longitudinal control target speed can be reflected only by 50% compared to the final entry.

The control point selection process described so far with reference to FIGS. 17 to 19 is summarized in a flowchart as follows.

In performing the longitudinal control in response to the cut-in target, main parameters are longitudinal/lateral distances and the vehicle speed of a vehicle in front. Therefore, the distance of the ego vehicle path (i.e., PLP) to the control point and the speed component at the control point on the ego vehicle path of the corresponding object (i.e., the component projected orthogonally to the speed vector of the other vehicle as the control point) correspond to the parameter for the longitudinal speed controlling of the ego vehicle 100.

Consequently, in order to determine the control point, it needs to calculate the location of the control point on the ego vehicle path according to the control point determination method described above, and calculate the path distance to the control point on the ego vehicle path and the speed component of the other vehicle at the control point. A flowchart of this process is shown in FIG. 20.

Figure 20:
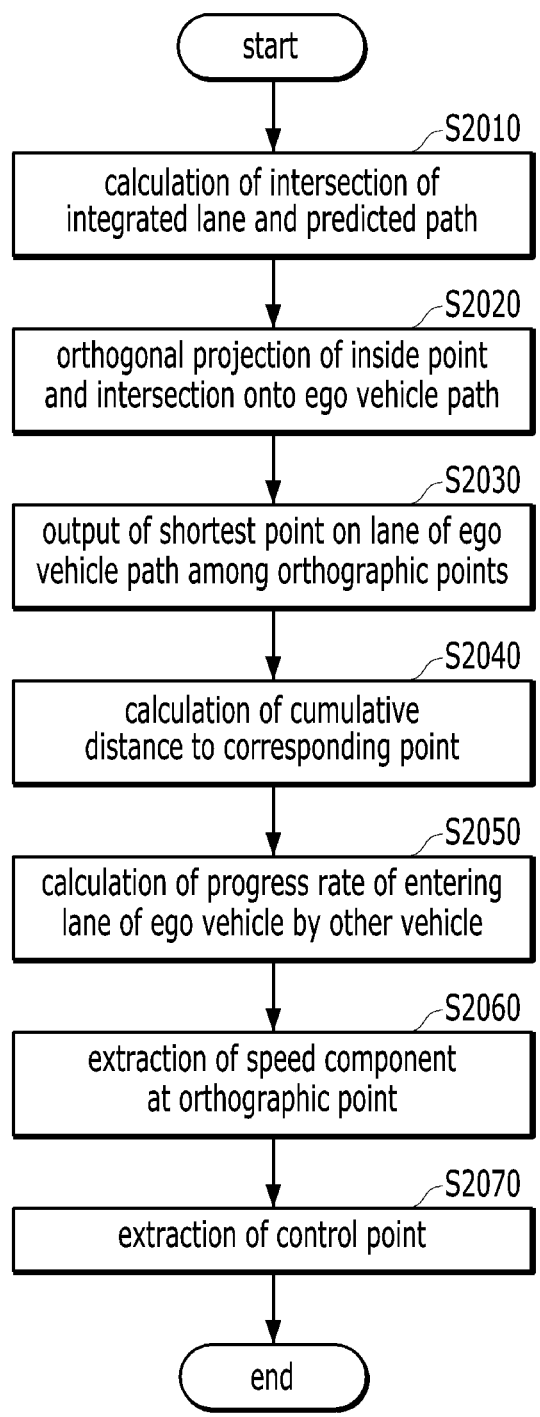
FIG. 20 is a flowchart illustrating an example of a process of extracting a control point according to an embodiment.

FIG. 20 is a flowchart illustrating an example of a control point extraction process according to an embodiment.

Referring to FIG. 20, for the final cut-in target determined by the final valid cut-in target determining module 165, the cut-in target control point calculating module 166 may calculate the intersections of the integrated lane and the predicted paths starting from each vertex of the final cut-in target (S2010).

The cut-in target control point calculating module 166 may orthographically project the intersections onto the ego vehicle path (S2020). In this case, if a box point is within the integrated lane (i.e., an inside point), an orthographic point may also be obtained for this.

Thereafter, the cut-in target control point calculating module 166 determines the shortest point on the ego vehicle path among orthographic points (S2030) and calculates the cumulative distance to the corresponding point (S2040).

In addition, the target control point calculating module 166 may calculate the progress rate of entering the lane of the ego vehicle by the other vehicle in order to gradually perform longitudinal control according to the ratio of approaching the lane of the ego vehicle in the lateral direction (S2050).

The target control point calculating module 166 may extract a speed component at the orthographic point (S2060). Here, the speed component means the speed of the other vehicle on the lane of the ego vehicle, which is a scalar value obtained by orthogonally projecting the speed vector of the other vehicle on the local coordinate system of the ego vehicle to the tangent vector of the control point location on the lane of the ego vehicle.

The control point is finally extracted through the above-described process (S2070), and a speed profile and a control path may be calculated based on the extracted control point. For example, with the distance to the control point as a target distance and the speed at the control point as a target speed, the calculation of the speed profile and control path for a follow-up control by PID control and the like can be performed.

By the cut-in response control method according to the embodiments described so far, it can determine the cut-in in the same manner as in a normal lane even at a point where a lane is discontinuous, a lane is changed, and a lanelink is abnormal. In other words, a consistent integrated lane can be drawn without exception every time a specific road occurs.

In addition, since the control points of the cut-in, in-pass, and deflection maintain continuity, it is possible to effectively prevent rattling and sudden braking during longitudinal control.

In addition, the cut-in target determination accuracy is improved by considering the change trend from the present to the future locations of the predicted path of the cut-in target candidate and the integrated lane, and the cut-in target determination accuracy can be improved by the signal information and whether there is the intersection of the predicted paths.

The embodiments described above can be implemented as computer-readable code on a medium in which a program is recorded. The computer-readable medium includes all kinds of recording devices in which data readable by a computer system is stored. Examples of computer-readable media include Hard Disk Drive (HDD), Solid State Disk (SSD), Silicon Disk Drive (SDD), ROM, RAM, CD-ROM, magnetic tape, floppy disk, optical data storage device, etc.

Accordingly, the above detailed description should not be construed as restrictive in all respects but as exemplary. The scope of the present invention should be determined by a reasonable interpretation of the appended claims, and all modifications within the equivalent scope of the present invention are included in the scope of the present invention.

What is claimed is:

1. A method of controlling a vehicle cut-in response, the method comprising:
    obtaining driving situation information;
    drawing an integrated lane-line, the drawing comprising:
        determining, based on the obtained driving situation information and a predetermined road condition, which one of a lanelink, a laneside, or a point level path (PLP) to use; and
        drawing the integrated lane-line based on the determined one;
    determining a cut-in target among at least one nearby vehicle that is predicted to enter the integrated lane-line based on the integrated lane-line and a predicted path of each of the at least one nearby vehicle;
    calculating a control point to be followed for driving control of an ego vehicle based on an intersection of the predicted path of the cut-in target and the integrated lane-line;
    generating a speed profile and a driving path based on the calculated control point; and
    performing the driving control based on a parameter corresponding to the speed profile and the driving path,
    wherein calculating the control point comprises:
        determining orthographic points on a lane of the ego vehicle with respect to the intersection and at least one of box points of the cut-in target within the integrated lane-line,
        determining a shortest point on the lane of the ego vehicle among the determined orthographic points,
        determining a path distance to the shortest point,
        determining a progress rate of entering the lane of the ego vehicle by the cut-in target, and
        extracting a speed component at the shortest point, and
    wherein generating the speed profile and the driving path is performed by setting the path distance to the shortest point as a target distance and the extracted speed component as a target speed, respectively.

2. The method according to claim 1, wherein drawing the integrated lane-line further comprises:
    determining whether or not the laneside satisfies a first condition of a lane width; and
    drawing the integrated lane-line based on the laneside, in response to the first condition being satisfied.

3. The method according to claim 2, wherein drawing the integrated lane-line further comprises:
    determining whether or not there is a difference between the lanelink and the PLP, in response to the first condition not being satisfied; and
        drawing the integrated lane-line based on the PLP, in response to there being the difference; or
        drawing the integrated lane-line based on the lanelink, in response to there being no difference.

4. The method according to claim 3, further comprising transforming a previous point level path of a previous frame from a local coordinate system to a global coordinate system before the determining the cut-in target when the integrated lane-line is drawn based on the PLP.

5. The method according to claim 1, wherein the determining the cut-in target comprises:
    determining at least one cut-in candidate target based on relative coordinates of box points of each of the at least one nearby vehicle with respect to the integrated lane-line;
    determining at least one cut-in target based on a future location of a first intersection of the predicted path of each of the at least one cut-in candidate target and the integrated lane-line and a second future location of the ego vehicle; and
    determining a final valid cut-in target among the at least one cut-in target.

6. The method according to claim 5, wherein determining the final valid cut-in target comprises performing filtering on the at least one cut-in target based on traffic light information and whether or not there is a second intersection between the predicted path of each of the at least one nearby vehicle.

7. A non-transitory computer-readable recording medium, recording a program for executing a method of controlling a vehicle cut-in, the method comprising:
    obtaining driving situation information;
    drawing an integrated lane-line, the drawing comprising:
        determining, based on the obtained driving situation information and a predetermined road condition, which one of a lanelink, a laneside, or a point level path (PLP) to use; and
        drawing the integrated lane-line based on the determined one;
    determining a cut-in target among at least one nearby vehicle that is predicted to enter the integrated lane-line based on the integrated lane-line and a predicted path of each of the at least one nearby vehicle;
    calculating a control point to be followed for driving control of an ego vehicle based on an intersection of the predicted path of the cut-in target and the integrated lane-line;
    generating a speed profile and a driving path based on the calculated control point; and
    performing the driving control based on a parameter corresponding to the speed profile and the driving path,
    wherein calculating the control point comprises:
        determining orthographic points on a lane of the ego vehicle with respect to the intersection and at least one of box points of the cut-in target within the integrated lane-line,
        determining a shortest point on the lane of the ego vehicle among the determined orthographic points,
        determining a path distance to the shortest point,
        determining a progress rate of entering the lane of the ego vehicle by the cut-in target, and extracting a speed component at the shortest point, and
wherein generating the speed profile and the driving path is performed by setting the path distance to the shortest point as a target distance and the extracted speed component as a target speed, respectively.

8. The non-transitory computer-readable recording medium according to claim 7, wherein drawing the integrated lane-line further comprises:
determining whether or not the laneside satisfies a first condition of a lane width; and
drawing the integrated lane-line based on the laneside, in response to the first condition being satisfied.

9. A vehicle for performing a cut-in response control, the vehicle comprising:
a driving controller;
a non-transitory computer-readable medium comprising program code;
a computer system in communication with the non-transitory computer-readable medium and with the driving controller, wherein the computer system executes the program code to:
obtain driving situation information;
draw an integrated lane-line, comprising the computer system executing the program code to:
determine, based on the obtained driving situation information and a predetermined road condition, which one of a lanelink, a laneside, or a point level path (PLP) to use; and
draw the integrated lane-line based on the determined one;
determine a cut-in target among at least one nearby vehicle that is predicted to enter the integrated lane-line based on the integrated lane-line and a predicted path of each of the at least one nearby vehicle;
calculate a control point to be followed for driving control of an ego vehicle based on an intersection of the predicted path of the cut-in target and the integrated lane-line;
generate a speed profile and a driving path based on the calculated control point;
determine orthographic points on a lane of the ego vehicle with respect to the intersection and at least one of box points of the cut-in target within the integrated lane-line;
determine a shortest point on the lane of the ego vehicle among the determined orthographic points;
determine a path distance to the shortest point;
determine a progress rate of entering the lane of the ego vehicle by the cut-in target; and
extract a speed component at the shortest point,
wherein to generate the speed profile and the driving path comprises setting the path distance to the shortest point as a target distance and setting the extracted speed component as a target speed, respectively, and
wherein the driving controller is configured to perform the driving control based on a control parameter corresponding to the speed profile and the PLP.

10. The vehicle according to claim 9, wherein the computer system executes the program code to:
determine whether or not the laneside satisfies a first condition of a lane width; and
draw the integrated lane-line based on the laneside, in response to the first condition being satisfied.

11. The vehicle according to claim 10, wherein the computer system executes the program code to:
determine whether or not there is a difference between the lanelink and the PLP, in response to the first condition not being satisfied;
draw the integrated lane-line based on the PLP, in response to there being the difference; and
draw the integrated lane-line based on the lanelink, in response to there being no difference.

12. The vehicle according to claim 11, wherein the computer system executes the program code to coordinate transformation of a previous point level path of a previous frame from a local coordinate system to a global coordinate system before determining the cut-in target, when the integrated lane-line is derived based on the PLP.

13. The vehicle according to claim 9, wherein the computer system executes the program code to:
determine at least one cut-in candidate target based on relative coordinates of box points of each of the at least one nearby vehicle with respect to the integrated lane-line;
determine at least one cut-in target based on a future location of a first intersection of the predicted path of each of the at least one cut-in candidate target and the integrated lane-line and a second future location of the ego vehicle; and
determine a final valid cut-in target among the at least one cut-in target.

14. The vehicle according to claim 13, wherein the computer system executes the program code to determine the final valid cut-in target by performing filtering on the at least one cut-in target based on traffic light information and whether or not there is a second intersection between the predicted path of each of the at least one nearby vehicle.

* * * * *